(12) United States Patent
Fujinawa et al.

(10) Patent No.: US 8,446,350 B2
(45) Date of Patent: May 21, 2013

(54) LIQUID CRYSTAL PANEL, LIQUID CRYSTAL PANEL DEVICE, DISPLAY DEVICE, AND PROJECTOR

(75) Inventors: Nobuhiro Fujinawa, Yokohama (JP); Takayuki Uchiyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 1004 days.

(21) Appl. No.: 12/382,608

(22) Filed: Mar. 19, 2009

(65) Prior Publication Data

US 2009/0243984 A1    Oct. 1, 2009

Related U.S. Application Data

(60) Provisional application No. 61/064,802, filed on Mar. 27, 2008, provisional application No. 61/064,891, filed on Apr. 1, 2008.

(30) Foreign Application Priority Data

Mar. 25, 2008 (JP) .................. 2008-077854
Mar. 31, 2008 (JP) .................. 2008-090742
Apr. 23, 2008 (JP) .................. 2008-112559

(51) Int. Cl.
*G09G 3/36* (2006.01)

(52) U.S. Cl.
USPC .............. 345/87; 345/89; 345/204; 345/690; 349/126; 349/138

(58) Field of Classification Search
USPC .... 345/87–100, 204, 690–695; 349/102–109, 349/117–119, 121, 138, 126
See application file for complete search history.

(56) References Cited

U.S. PATENT DOCUMENTS

| 4,624,530 | A | 11/1986 | Takahara et al. |
| 6,256,123 | B1 * | 7/2001 | Hazama ........................... 359/25 |
| 6,762,814 | B2 * | 7/2004 | Watanabe ..................... 349/141 |
| 7,292,299 | B2 * | 11/2007 | Hiyama et al. ................ 349/119 |

(Continued)

FOREIGN PATENT DOCUMENTS

| EP | 0 636 917 A1 | 2/1995 |
| JP | 04-195022 A | 7/1992 |

(Continued)

OTHER PUBLICATIONS

European Search Report for Application No. 09155827.0, issued Oct. 22, 2009.

(Continued)

*Primary Examiner* — Quan-Zhen Wang
*Assistant Examiner* — Jennifer Nguyen
(74) *Attorney, Agent, or Firm* — Miles & Stockbridge P.C.

(57) ABSTRACT

A liquid crystal panel includes: a liquid crystal containing liquid crystal molecules; a plurality of pixel electrodes that is capable of applying electric fields to the liquid crystal; a common electrode opposite to the plurality of the pixel electrodes through the liquid crystal; a first rubbing member that aligns the liquid crystal molecules in a first direction at an interface of the liquid crystal on a side of the pixel electrode; and a second rubbing member that aligns the liquid crystal molecules in a second direction at an interface of the liquid crystal on a side of the common electrode, wherein a transparent insulator layer is formed on an area on a side in a direction orthogonal to the first direction in the pixel electrode.

32 Claims, 34 Drawing Sheets

U.S. PATENT DOCUMENTS

| | | | |
|---|---|---|---|
| 7,505,053 | B2 | 3/2009 | Brown Elliott et al. |
| 7,583,279 | B2 | 9/2009 | Brown Elliott et al. |
| 7,719,780 | B2 * | 5/2010 | Wang et al. .................. 359/891 |
| 2002/0118334 | A1 | 8/2002 | Satake |
| 2004/0046725 | A1 | 3/2004 | Lee |
| 2004/0125302 | A1 | 7/2004 | Kim |
| 2006/0097970 | A1 * | 5/2006 | Takeda et al. .................. 345/89 |
| 2006/0109412 | A1 | 5/2006 | Hsiao et al. |
| 2006/0268203 | A1 | 11/2006 | Kurahashi et al. |
| 2007/0285442 | A1 * | 12/2007 | Higgins ........................ 345/690 |

FOREIGN PATENT DOCUMENTS

| | | |
|---|---|---|
| JP | A-6-118447 | 4/1994 |
| JP | 06-281959 A | 10/1994 |
| JP | 07-294936 A | 11/1995 |
| JP | 08-015678 A | 1/1996 |
| JP | 09-311314 A | 12/1997 |
| JP | A-10-186400 | 7/1998 |
| JP | 11-030788 A | 2/1999 |
| JP | 2002-357843 A | 12/2002 |
| JP | 2004-102292 A | 4/2004 |
| JP | A-2005-24923 | 1/2005 |
| JP | 2006-330610 A | 12/2006 |
| JP | 2007-532949 A | 11/2007 |
| JP | A-2008-46336 | 2/2008 |
| JP | A-2008-46337 | 2/2008 |
| WO | WO 2005/101807 A2 | 10/2005 |

OTHER PUBLICATIONS

Office Action issued on Sep. 11, 2012 in Japanese Appln. No. 2008-112559.

Umeda et al.; "Method of Evaluating Tilt Domain in a Twisted Nematic Cell;" *Japanese Journal of Applied Physics*; Nov. 1981; pp. 2025-2031; vol. 20; No. 11.

Shimada et al.; "Alignment Technique for Thin-Film-Transistor Liquid-Crystal Displays;" *Japanese Journal of Applied Physics*; Nov. 1991; pp. 3308-3312; vol. 30; No. 11B.

Extended European search report, including search opinion, for European Patent Application No. 12 172 831.5, Aug. 17, 2012.

Office Action issued in Japanese Patent Application No. 2008-077854, Jul. 10, 2012.

Office Action issued in European Patent Application No. 09 155 827.0, Aug. 9, 2012.

Office Action (Notification of Reason(s) for Refusal) issued Nov. 13, 2012, in Japanese Patent Application No. 2008-077854.

Office Action (Notification of Reason(s) for Refusal) issued Feb. 5, 2013, in Japanese Patent Application No. 2008-112559.

\* cited by examiner

RUBBING DIRECTION ON PIXEL ELECTRODE SIDE

RUBBING DIRECTION ON
PIXEL ELECTRODE SIDE

RUBBING DIRECTION ON
PIXEL ELECTRODE SIDE

LIQUID CRYSTAL PANEL, LIQUID CRYSTAL PANEL DEVICE, DISPLAY DEVICE, AND PROJECTOR

INCORPORATION BY REFERENCE

This non-provisional application claims the benefit of U.S. Provisional Application No. 61/064,802 filed Mar. 27, 2008, and No. 61/064,891 filed Apr. 1, 2008. This application also claims priority from Japanese Application No. 2008-077854 filed Mar. 25, 2008, No. 2008-090742 filed Mar. 31, 2008, and No. 2008-112559 filed Apr. 23, 2008. The disclosure of each of the earlier applications is incorporated herein by reference in its entirety.

BACKGROUND OF THE INVENTION

1. Field of the Invention

The present invention relates to a liquid crystal panel, a liquid crystal panel device, a display device, and a projector.

2. Description of Related Art

Japanese Laid-open Patent Publication No. 06-118447 discloses an active matrix type liquid crystal panel that includes a common electrode provided with a slit along the direction of a signal line in order to prevent crosstalk by the signal line.

SUMMARY OF THE INVENTION

Miniaturization of pixels (or a decrease in pixel size) makes it necessary to suppress influences of crosstalk by pixel electrodes as well as crosstalk by signal lines.

According to the 1st aspect of the present invention, a liquid crystal panel comprises: a liquid crystal containing liquid crystal molecules; a plurality of pixel electrodes that is capable of applying electric fields to the liquid crystal; a common electrode opposite to the plurality of the pixel electrodes through the liquid crystal; a first rubbing member that aligns the liquid crystal molecules in a first direction at an interface of the liquid crystal on a side of the pixel electrode; and a second rubbing member that aligns the liquid crystal molecules in a second direction at an interface of the liquid crystal on a side of the common electrode, wherein a transparent insulator layer is formed on an area on a side in a direction orthogonal to the first direction in the pixel electrode.

According to the 2nd aspect of the present invention, in a liquid crystal panel according to the 1st aspect, it is preferred that each of the pixel electrodes has a rectangular shape, the first direction is a direction of a diagonal line of the pixel electrode, pixels corresponding to the pixel electrodes are arranged in a delta array, and the transparent insulator layer is formed at a corner in a direction orthogonal to the first direction in the pixel electrode.

According to the 3rd aspect of the present invention, in a liquid crystal panel according to the 2nd aspect, it is preferred that the transparent insulator layer is further formed in an area of other pixel electrodes that are adjacent to the corner in the direction orthogonal to the first the direction.

According to the 4th aspect of the present invention, in a liquid crystal panel according to the 1st aspect, it is preferred that the common electrode includes an electric field control member that controls an influence of an electric field generated between the common electrode and the first pixel electrode among the pixel electrodes on the liquid crystal molecules arranged on the side of the common electrode among the liquid crystal molecules on a second pixel electrode adjacent to the first pixel electrode.

According to the 5th aspect of the present invention, a liquid crystal panel including a plurality of rectangular pixels in a delta array, the liquid crystal panel comprises: a liquid crystal containing liquid crystal molecules; a plurality of rectangular pixel electrodes that is capable of applying electric fields to the liquid crystal; a common electrode opposite to the plurality of the pixel electrodes through the liquid crystal; a first rubbing member that aligns the liquid crystal molecules in a direction of diagonal line of the pixel electrode at an interface of the liquid crystal on a side of the pixel electrode; and a second rubbing member that aligns the liquid crystal molecules in a second direction at an interface of the liquid crystal on the side of the common electrode, wherein the common electrode includes an electric field control member that controls an influence of an electric field generated between the common electrode and the first pixel electrode among the pixel electrodes on the liquid crystal molecules arranged on the side of the common electrode among the liquid crystal molecules on a second pixel electrode adjacent to the first pixel electrode.

According to the 6th aspect of the present invention, in a liquid crystal panel according to the 4th aspect, it is preferred that the electric field control member includes a slit-like non-conductive part formed on the common electrode along a corner in a direction orthogonal to the first direction in the pixel electrode.

According to the 7th aspect of the present invention, in a liquid crystal panel according to the 4th aspect, it is preferred that the electric field control member includes a transparent insulator layer formed on the common electrode along a corner in a direction orthogonal to the first direction in the pixel electrode.

According to the 8th aspect of the present invention, a display device comprises a liquid crystal panel according to the 1st aspect.

According to the 9th aspect of the present invention, a projector comprises a liquid crystal panel according to 1st aspect.

According to the 10th aspect of the present invention, a liquid crystal panel comprises: a liquid crystal of which a direction of alignment is set; a color filter including a plurality of color separation filters that separates incident light into a plurality of color components; a plurality of white filters adjacent to the color filters as sandwiched between at least two of the color separation filters among the plurality of the color separation filters; and a light quantity control electrode that controls light quantity of light that is transmitted through the color separation filters and the white filter by controlling the alignment of the liquid crystal, wherein a pixel array for a display includes a plurality of pixels that corresponds to the plurality of color separation filters and a plurality of pixels that corresponds to the plurality of white filters.

According to the 11th aspect of the present invention, in a liquid crystal panel according to the 10th aspect, it is preferred that the light quantity control electrode includes a pixel electrode provided for each of the color separation filters and the white filters and a common electrode common to the pixel electrodes.

According to the 12th aspect of the present invention, in a liquid crystal panel according to the 11th aspect, it is preferred that the common electrode is provided opposite to the plurality of pixel electrodes through the liquid crystal, and the liquid crystal panel comprises: a first alignment film that is provided on a side of the common electrode and that aligns the liquid crystal in the first direction; and a second alignment film that is provided on a side of the pixel electrode and that aligns the liquid crystal in the second direction, and wherein the white filter is arranged adjacent to the color separation filters in a direction substantially orthogonal to the second direction.

According to the 13th aspect of the present invention, in a liquid crystal panel according to the 11th aspect, it is preferred that the white filter is arranged in an area where the light quantity of a light that is transmitted through the pixel without the white filter is decreased to a value smaller than a predetermined value due to turbulence of the alignment of the liquid crystal by a pixel signal applied to the adjacent pixel electrodes.

According to the 14th aspect of the present invention, in a liquid crystal panel according to the 10th aspect, it is preferred that a shape of the color separation filter is a polygon, a number of corners of which is six or more.

According to the 15th aspect of the present invention, in a liquid crystal panel according to the 10th aspect, a shape of the white filter may be a triangle or a quadrangle.

According to the 16th aspect of the present invention, in a liquid crystal panel according to the 10th aspect, it is preferred that the plurality of color separation filters is arranged in a delta array, and a shape of the white filter is a parallelogram, and a length of a diagonal line of the white filter is ½ of a length of a longer side of the parallelogram when the rectangular shape is formed by a combination of a shorter side of the white filter, the diagonal line of the white filter, and a side of the color separation filter that is not in contact with the white filter.

According to the 17th aspect of the present invention, in a liquid crystal panel according to the 12th aspect, it is preferred that a shape of the white filter is a quadrangle having longer sides, and an angle between the longer side of the white filter and the second direction is either 0° or an acute angle.

According to the 18th aspect of the present invention, in a liquid crystal panel according to the 10th aspect, a ratio of a total area of the white filter to a total area of the color separation filter may be 20% or smaller.

According to the 19th aspect of the present invention, in a liquid crystal panel according to the 10th aspect, a total area of the white filter may be equal to or smaller than a total area of each of the plurality of color separation filters.

According to the 20th aspect of the present invention, a liquid crystal panel device comprises: a liquid crystal panel according to the 10th aspect; and a pixel signal generation unit that generates a pixel signal applied to the light quantity control electrode, wherein the pixel signal generation unit generates the pixel signal such that a value of a gradation of brightness of the pixel displayed by the white filter is equal to or smaller than each of values of gradation of brightness of pixels displayed by adjacent two color separation filters sandwiching the white filter when the pixels displayed by adjacent two color separation filters sandwiching the white filter displays colors other than black.

According to the 21st aspect of the present invention, a liquid crystal panel device comprises: a liquid crystal panel according to the 10th aspect; and a pixel signal generation unit that generates a pixel signal applied to the light quantity control electrode, wherein the pixel signal generation unit generates the pixel signal such that a value of gradation of brightness of the pixel displayed by the white filter is equal to a value of gradation of brightness of the pixels displayed by four color separation filters, when three of four color separation filters surrounding the white filter are color separation filters corresponding to respective color components and values of gradation of brightness of respective pixels displayed by the four color separation filters are equal.

According to the 22nd aspect of the present invention, a liquid crystal panel device comprises: a liquid crystal panel according to the 10th aspect; and a pixel signal generation unit that generates a pixel signal applied to the light quantity control electrode, wherein the pixel signal generation unit generates the pixel signal such that a value of a gradation of brightness of the pixel displayed by the white filter is larger than 0, when a shape of the white filter is a quadrangle having longer sides and the pixel displayed by the color separation filter that is in contact with the longer sides of the white filter displays black.

According to the 23rd aspect of the present invention, a liquid crystal panel device comprises: a liquid crystal panel according to the 10th aspect; and a pixel signal generation unit that generates a pixel signal applied to the light quantity control electrode, wherein the pixel signal generation unit generates the pixel signal such that a value of a gradation of brightness of the pixel displayed by the white filter is larger than 0, when the color separation filter corresponding to the pixel that displays black is in contact with the white filter on a side in a direction substantially orthogonal to the first rubbing direction.

According to the 24th aspect of the present invention, a liquid crystal panel device comprises: a liquid crystal panel according to the 10th aspect; and a pixel signal generation unit that generates a pixel signal applied to the light quantity control electrode, wherein the pixel signal generation unit generates the pixel signal such that a value of a gradation of brightness of the pixel displayed by the white filter is 0, when a shape of the white filter is a quadrangle having longer sides and the pixel displayed by the color separation filter that is in contact with the longer sides of the white filter displays black.

According to the 25th aspect of the present invention, a display device comprises a liquid crystal panel according to the 10th aspect.

According to the 26th aspect of the present invention, a display device comprises a liquid crystal panel according to the 20th aspect.

According to the 27th aspect of the present invention, a projector comprises a liquid crystal panel according to the 10th aspect.

According to the 28th aspect of the present invention, a projector comprises a liquid crystal panel according to the 20th aspect.

DESCRIPTION OF PREFERRED EMBODIMENTS

Hereinafter, preferred embodiments of the present invention will be explained with reference to the attached drawings.

First Embodiment

In the liquid crystal panel in the first embodiment, the influences by pixel electrode of adjacent pixels can be controlled by forming a transparent insulator layer on each pixel electrode to be detailed later.

Figure 1:
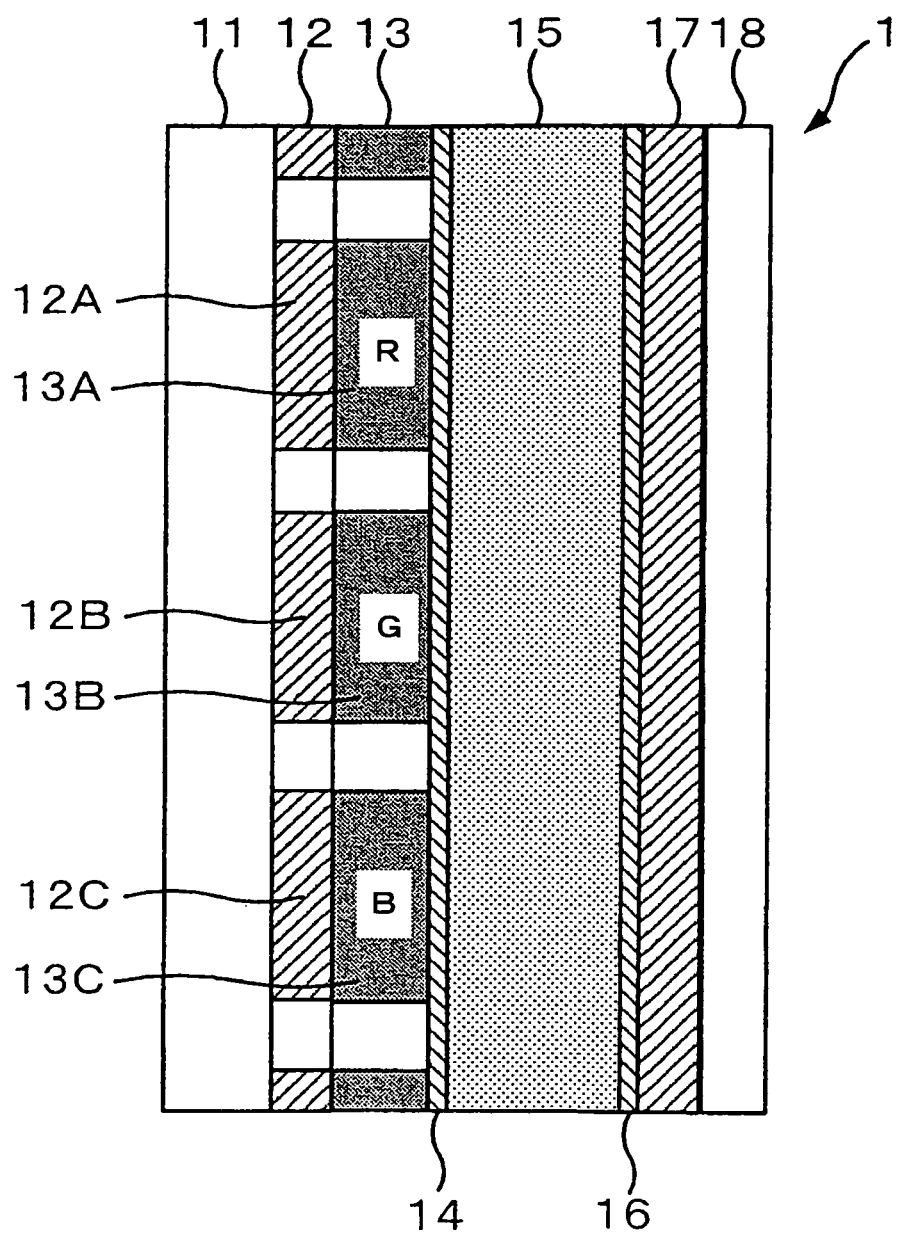
FIG. 1 is a diagram illustrating the structure of a liquid crystal panel according to a first embodiment of the present invention.

FIG. 1 is a diagram illustrating the structure of a liquid crystal panel 1 according to a first embodiment of the present invention. The liquid crystal panel 1 according to the first embodiment of the present invention is a reflection type liquid crystal panel, which realizes its function as a display device with a light that enters the liquid crystal panel 1. The liquid crystal panel 1 is constituted by a TN (Twisted Nematic) type liquid crystal. In the liquid crystal panel 1, the liquid crystal molecules are arranged such that they are twisted by 90° around an axis along a planar direction of the liquid crystal panel 1 upon reflection. The liquid crystal panel 1 according to the first embodiment of the present invention is a liquid crystal panel of an active matrix system that includes TFTs (Thin Film Transistors). Each of the pixels in the liquid crystal panel 1 is provided with an ON/OFF switch constituted by the TFT.

The liquid crystal panel 1 includes a TFT device-formed Si substrate 11, a pixel electrode 12, a color filter 13, an alignment film 14, a liquid crystal 15, an alignment film 16, a common electrode 17, and a glass substrate 18. The liquid crystal panel 1 possesses no polarizer, and the liquid crystal panel 1 is used in combination with a PBS (Polarizing Beam Splitter) block (see FIG. 16B). The PBS block is a polarizer of a cube form that is fabricated by depositing a polarization isolation film on respective slopes (polarization planes) of rectangular prisms and bonding the prisms such that they contact on the slopes (polarization planes). Of the lights that have entered the PBS block, a light having a predetermined oscillation direction is transmitted through the polarization plane and other lights having other predetermined oscillation directions are reflected on the polarization plane.

The TFT device-formed Si substrate 11 is an Si substrate having formed on the surface thereof TFT devices. The TFT device is formed for each pixel electrode. It is an ON/OFF switch that controls charging or supply of charges (pixel signals) in the pixel electrode described hereinbelow. When the TFT device is ON in a state where a voltage is applied thereto, an electric current flows in the pixel electrode. When the electric current flows in the pixel electrode, electric charges are accumulated in the pixel electrode and as a result a voltage is applied to a liquid crystal 15. When the TFT device is turned OFF, the charges accumulated in the pixel electrode will not flow out from the pixel electrode. As a result, the charges accumulated in the pixel electrode are held and the voltage applied to the liquid crystal 15 is held. If the TFT device is turned ON thereafter in a state where no voltage is applied, an electric current flows from the pixel electrode. When the electric current flows from the pixel electrode, the charges accumulated in the pixel electrode are discharged, so that application of voltage to the liquid crystal 15 is cancelled.

The pixel electrode 12 is provided for each pixel on which description is made herein after. The pixel electrode 12 is a metal electrode having reflectivity, for example, an aluminum plate. It applies a voltage to the liquid crystal 15. The pixel electrodes 12 are formed on the TFT device-formed Si substrate 11. A plurality of pixel electrodes 12 is arranged in parallel both horizontally and vertically. The charges supplied to the pixel electrodes 12 are controlled for every pixel electrode corresponding to the ON/OFF state of the TFT device one by one.

The color filter 13 includes a red (R) filter 13A that transmits only a red light, a green (G) filter 13B that transmits only a green light, and a blue (B) filter 13C that transmits only a blue light. Each of the filters 13A to 13C is a square in shape (see FIG. 2A). Hereafter, the filters 13A to 13C are referred to as square filters generically. Each square filter has a dimension of, for example 10 μm for each side. Each of the square filters 13A to 13C is formed on each of the pixel electrodes 12.

The alignment films 14 and 16 are films that are used to align liquid crystal molecules in respective predetermined directions of the polarization axis. The alignment films 14 and 16 have each a thickness of about 0.1 μm and are made of a high polymer film such as a polyimide film. The alignment films 14 and 16 are prepared by performing rubbing treatment on the surface of the above-mentioned high polymer film. The rubbing treatment is a treatment in which the surface of a polymer film is rubbed with a cloth wound around a roller. The liquid crystal molecules in contact with the alignment films 14 and 16 at the interfaces between the liquid crystal 15 and the alignment films 14 and 16 are aligned in the direction in which the alignment films have been rubbed by the rubbing treatment. Hereafter, the direction along which the liquid crystal molecules are aligned is referred to as "rubbing direction". In this case, the direction along which the surface of the polymer film is rubbed with the cloth wound around the roller is the rubbing direction. The rubbing direction of the alignment films 14 and 16 is at an angle of 45°. Since the liquid crystal molecules have the property of tending to align in the same direction, the direction of alignment of liquid crystal molecules gradually changes from the rubbing direction of the alignment film 1A to the rubbing direction of the alignment film 16. As a result, the liquid crystal molecules are aligned as twisted by 45° around an axis along the planar direction of the liquid crystal panel 1. Since the liquid crystal panel 1 is of the reflection type, the light that enters into the liquid crystal 15 travels along a round-trip optical path to go and return in the liquid crystal, thus exhibiting a polarization change corresponding to a 90°-twist.

The common electrode 17 is a transparent electrode made of ITO (Indium Tin Oxide) or the like disposed opposite to the pixel electrode 12. Also, the common electrode 17 is formed by plasma CVD or sputtering. The common electrode 17 is connected to the ground potential to generate an electric field in the liquid crystal depending on a difference in potential between the common electrode 16 and the pixel electrodes 12 in which charges are accumulated.

A single pixel includes the square filters 13A to 13C, the alignment film 14, the liquid crystal 15, the common electrode 17, and the glass substrate 18. Each pixel has a square shape.

The principle in which a pixel in the liquid crystal panel 1 is displayed/non-displayed will be explained with reference to FIG. 1. When the pixel electrode 12 is not charged, the pixel is displayed with a light that enters the liquid crystal panel 1. That is, the arrangement of the liquid crystal molecules in the liquid crystal 15 is the above-mentioned 45°-twisted arrangement. Only the linearly polarized light that oscillates in a predetermined direction is allowed to enter a display screen of the liquid crystal panel 1 by a PBS block (not shown). The incident light is transmitted through the glass substrate 18, the common electrode 17, and the alignment film 16. Thereafter, the incident light is transmitted through the liquid crystal 15, the alignment film 14, and the color filter 13 and is reflected by the pixel electrode 12.

The light reflected by the pixel electrode 12 finally becomes a linearly polarized light having an oscillation direction rotated by 90° with respect to the oscillation direction of the incident linearly polarized light due to the twisted arrangement of the liquid crystal molecules in the liquid crystal 15. The linearly polarized light whose oscillation direction has been rotated by 90° is irradiated from the liquid crystal panel 1 to the PBS block (not shown). The transmitted light whose oscillation direction has been rotated by 90° is reflected on the polarization plane of the PBS block and is irradiated in the predetermined direction.

On the other hand, when the pixel electrode 12 is charged, the oscillation direction of the light reflected by the liquid crystal panel 1 is not rotated by 90°. As a result, the reflected light from the liquid crystal panel 1 is transmitted through the polarization plane of the PBS block and is not radiated in the predetermined direction.

As mentioned above, control of the supply of charges in the pixel electrode 12 enables reproduction of all the colors by a single pixel, for example, by allowing only the R filter 13A to transmit the light, by allowing only the R filter 13A and the G filter 13B to transmit the light, or the like.

The control unit that controls the influence on a respective pixel of the electric field by pixel electrodes that are adjacent to the respective pixel is described referring to FIGS. 2A to 4. In this embodiment, explanation is made on the case where only the pixel of the G filter 13B is displayed but the pixels of the R filter 13A and the B filter 13C are not displayed. In this case, the pixel electrodes 12 in the R filter 13A and the B filter 13C, respectively, are charged but the pixel electrode 12 in the G filter 13B is not charged.

Figure 2A:
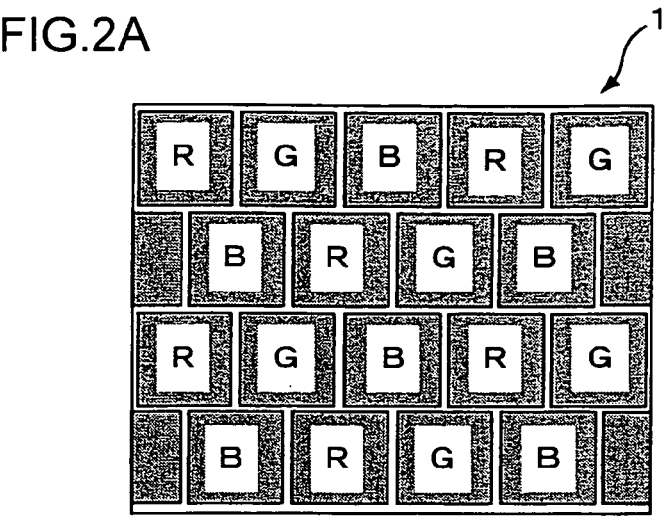
FIGS. 2A to 2C are diagrams illustrating the rubbing directions of alignment films according to the first embodiment of the present invention, with FIG. 2A showing an example of arrangement of the color filters in the liquid crystal panel, FIG. 2B showing the rubbing direction of the alignment film on the common electrode side, and FIG. 2C showing the rubbing direction of the alignment film on the color filter side.
Figure 2B:
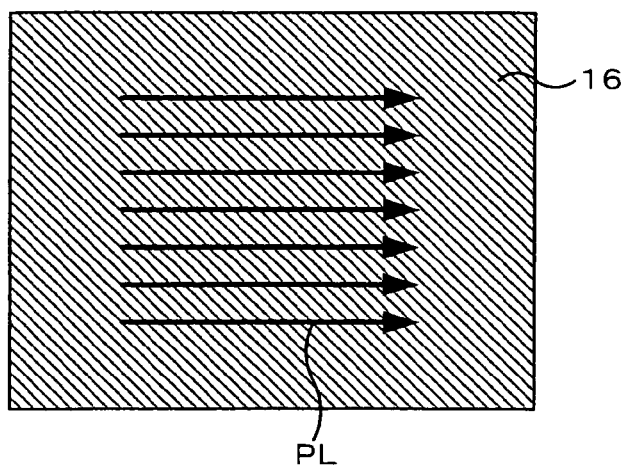
Figure 2C:
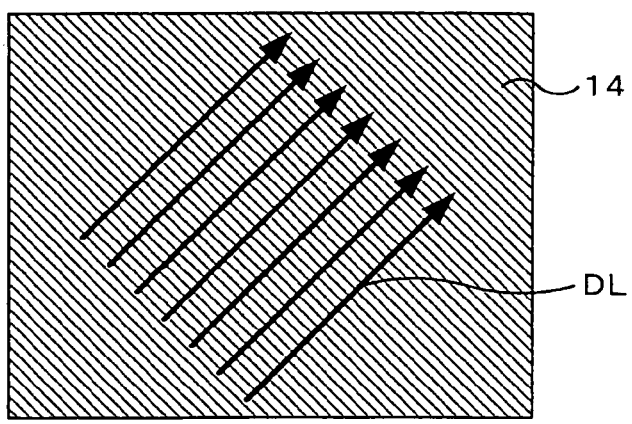

FIG. 2A is a diagram illustrating the arrangement of pixels in the first embodiment of the present invention. The shape of one pixel is a square as mentioned above, and a delta array is used for displaying colors. FIG. 2B is a diagram illustrating the rubbing direction of the alignment film 16 on the common electrode 17 side in the first embodiment. The rubbing direction of the alignment film 16 on the common electrode 17 side is a horizontal direction (PL) going from the left to the right of the square filter. FIG. 2C is a diagram illustrating the rubbing direction of the alignment film 14 on the pixel electrode 12 side in the first embodiment. The rubbing direction of the alignment film 14 on the pixel electrode 12 side is the direction of diagonal line (DL) going from the left below to the right upper of the square filter.

Figure 3A:
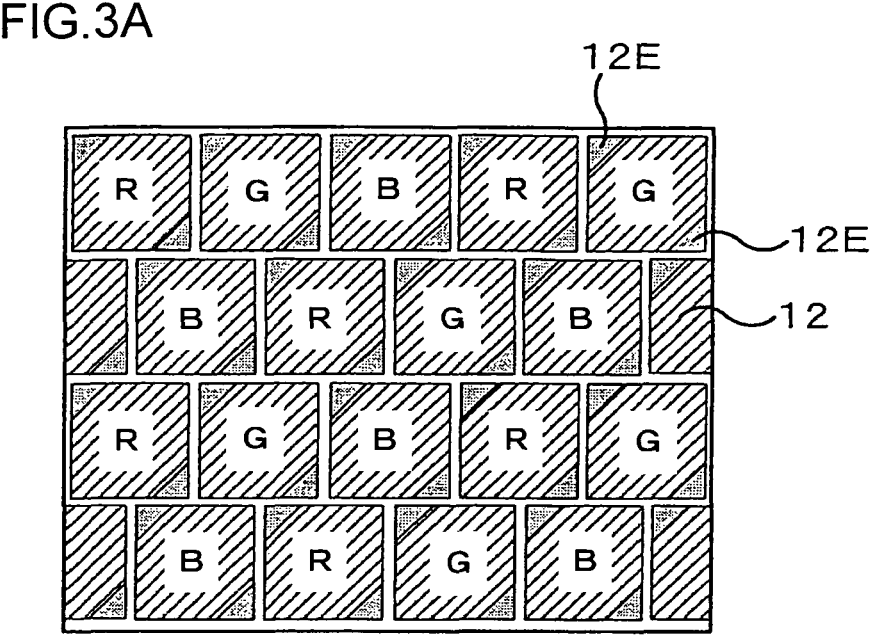
FIG. 3A is a diagram illustrating pixel electrodes and FIG. 3B is a diagram illustrating a display of the liquid crystal panel.
Figure 3B:
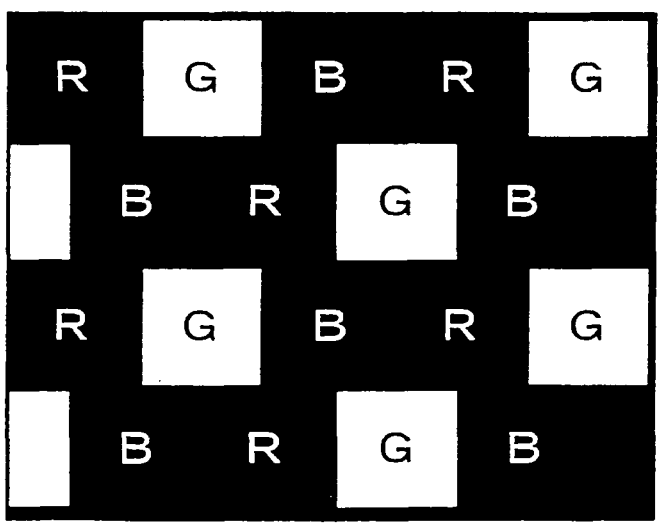

FIG. 3A is a diagram illustrating the pixel electrode 12 in the first embodiment of the present invention. The pixel electrode 12 has a square electrode configuration. On corner portions at the upper left and lower right portions of each pixel electrode, i.e., on the corner portions that are present in a direction orthogonal to the rubbing direction (DL) in the alignment film 14 on the pixel electrode 12 side, respective transparent insulator layers 12E of a triangular shape are formed. The transparent insulator layers 12E are formed on the surface of the pixel electrode 12 on the color filter 13 side. The influences by the electric charges of the pixel electrode 12A of the R filter 13A and the pixel electrode 12C of the B filter 13C can be controlled with the transparent insulator layers 12E in the pixel of the G filter 13B. As a result, as shown in FIG. 3B, the light quantity of the light flux that is transmitted through the G filter 13B and reflected on the polarization plane of the PBS block becomes substantially uniform, so that a reduction in light quantity of the displayed light due to the influences by the pixel electrodes 12 of the adjacent pixels is controlled.

Figure 4:
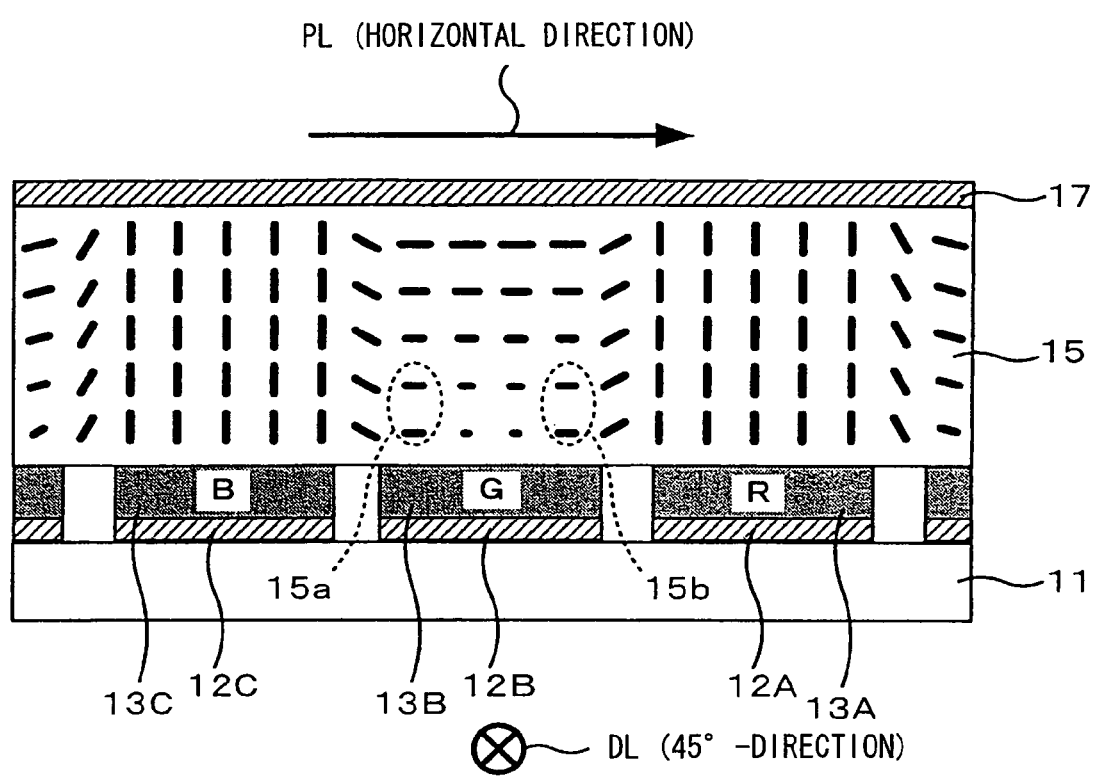
FIG. 4 is a diagram illustrating the arrangement of liquid crystal molecules influenced by the electric fields from the pixel electrodes of adjacent pixels.

As shown in FIG. 4, power to rotate the liquid crystal molecules 15a and 15b on the pixel electrode side of the G filter 13B by 90° is generated by the influences of the electric fields from the pixel electrode 12A of the R filter 13A and the pixel electrode 12C of the B filter 13C and the twisted arrangement of the liquid crystal molecules is broken up. However, the influences of the electric fields from the pixel electrode 12A of the R filter 13A and the pixel electrode 12C of the B filter 13C are weakened by forming the transparent insulator layer 12E to the pixel electrode 12B, and the breaking up of the twisted arrangement of the liquid crystal molecules is controlled.

Figure 5A:
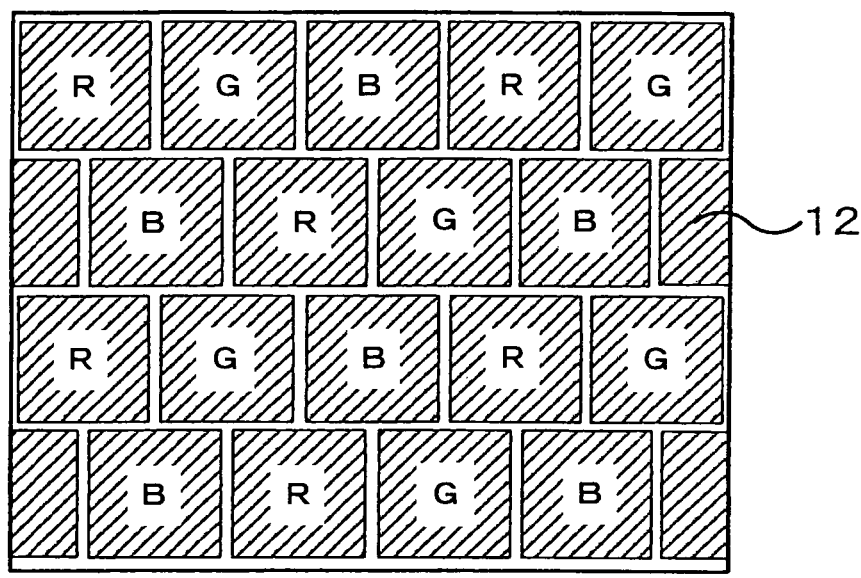
FIG. 5A is a diagram illustrating pixel electrodes in a comparative example of the first embodiment and FIG. 5B is a diagram illustrating a liquid crystal panel of the comparative example.
Figure 5B:
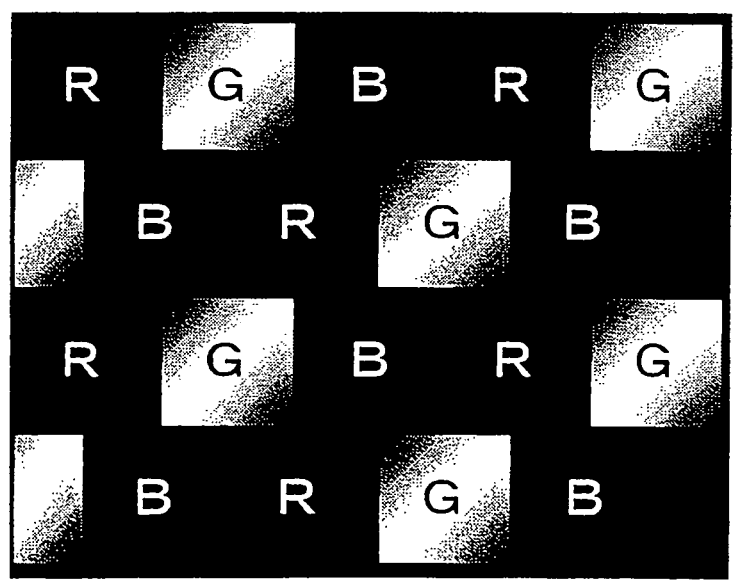

Referring to FIGS. 5A and 5B, a comparative example of the liquid crystal panel 1 according to the first embodiment is explained. Hereafter, explanation is made assuming that the rubbing directions of the alignment films 14 and 16 in the comparative example are identical to the rubbing direction of the first embodiment. FIG. 5A is a diagram illustrating the pixel electrodes 12 in the comparative example. The pixel electrode 12 is not formed of the transparent insulator layer 12E. In this case, the quantity of displayed light of the pixel decreases around the corners in the upper left and lower right of the G filter 13B as shown in FIG. 5B.

According to the first embodiment as described above, the following advantageous effect can be obtained.

The transparent insulator layers 12E is formed in an area of each of the pixel electrodes 12 on the sides of the direction orthogonal to the rubbing direction (DL) of the alignment film 14 on the pixel electrode 12 side. This can control the influences of the electric fields caused by the adjacent pixel electrodes 12 on the arrangement of the liquid crystal molecules corresponding to each pixel.

Second Embodiment

The liquid crystal panel according to a second embodiment of the present invention will be explained. In this liquid crystal panel, the influences of the electric fields by adjacent pixel electrodes can be controlled by forming slits in the common electrode.

The liquid crystal panel according to the second embodiment differs from the liquid crystal panel 1 according to the first embodiment in the structure of the common electrode. The other structures are the same as those in the first embodiment. Accordingly, explanation is focused on the common electrode.

Referring to FIGS. 6A to 9, the common electrode 17 of the liquid crystal panel 1A according to the second embodiment is explained. Explanation hereafter is made assuming that similarly to the first embodiment, only the pixel of the G filter 13B is displayed but the pixels of the R filter 13A and the B filter 13C are not displayed.

Figure 6A:
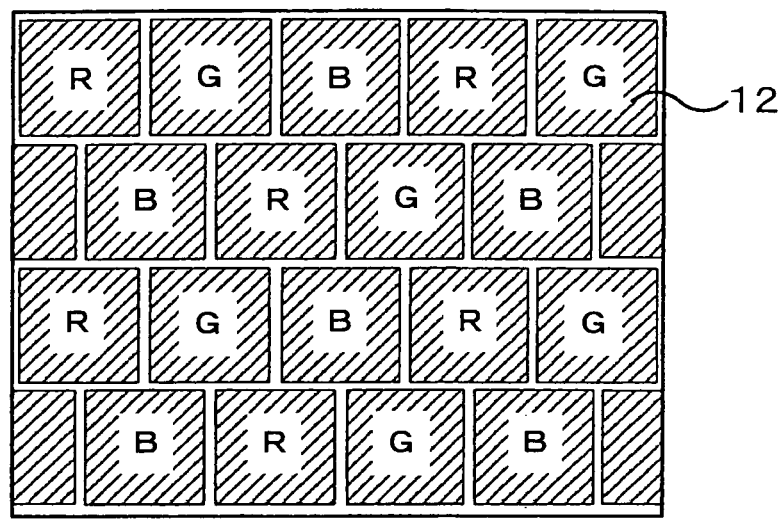
FIG. 6A is a diagram illustrating pixel electrodes in a second embodiment and FIG. 6B is a diagram illustrating a common electrode in the second embodiment.
Figure 6B:
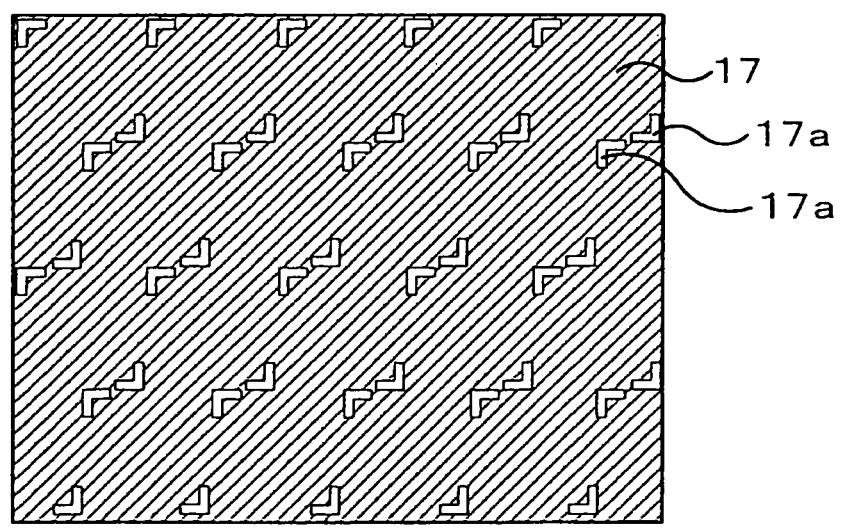
Figure 7:
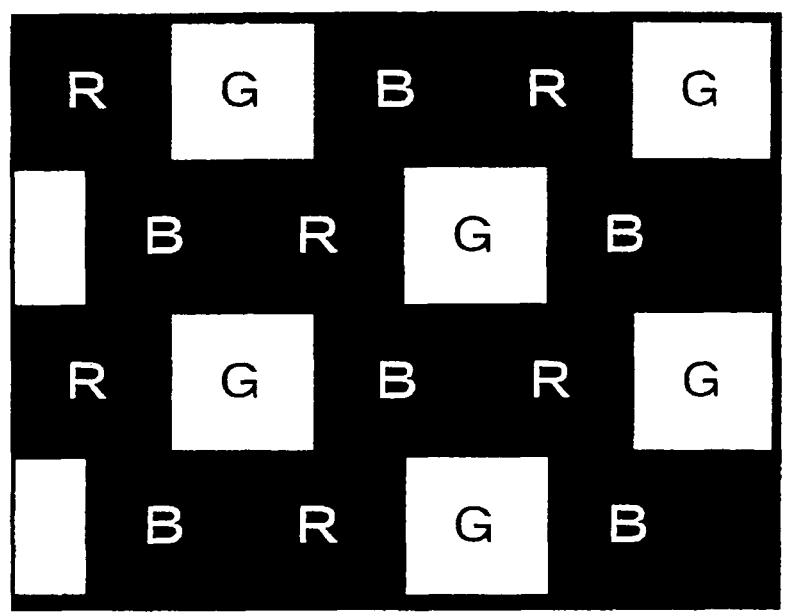
FIG. 7 is a diagram illustrating a display of the liquid crystal panel in the second embodiment.

FIG. 6A is a diagram illustrating the pixel electrode in the second embodiment. The pixel electrode 12 has a square electrode configuration similarly to the pixel electrode 12 in the first embodiment. FIG. 6B is a diagram illustrating the common electrode 17 in the second embodiment. Slits 17a are formed in respective parts of the common electrode 17 corresponding to parts along an upper left corner and a lower right corner of each pixel electrode. In other words, the slits 17a are portions where no ITO film is formed on the glass substrate 18, which parts correspond to the respective parts along the corners that are present in the direction orthogonal to the rubbing direction (DL) of the alignment film 14 on the pixel electrode 12 side. Such slits 17a can be formed by forming the common electrode 17 with masking the substrate with a resist. As a result, as shown in FIG. 7, the quantity of light that is transmitted through the G filters 13B and radiated after being reflected on the PBS block becomes substantially uniform, so that a reduction in light quantity of the displayed light due to the influences by the pixel electrodes 12 of the adjacent pixels is controlled.

Figure 8A:
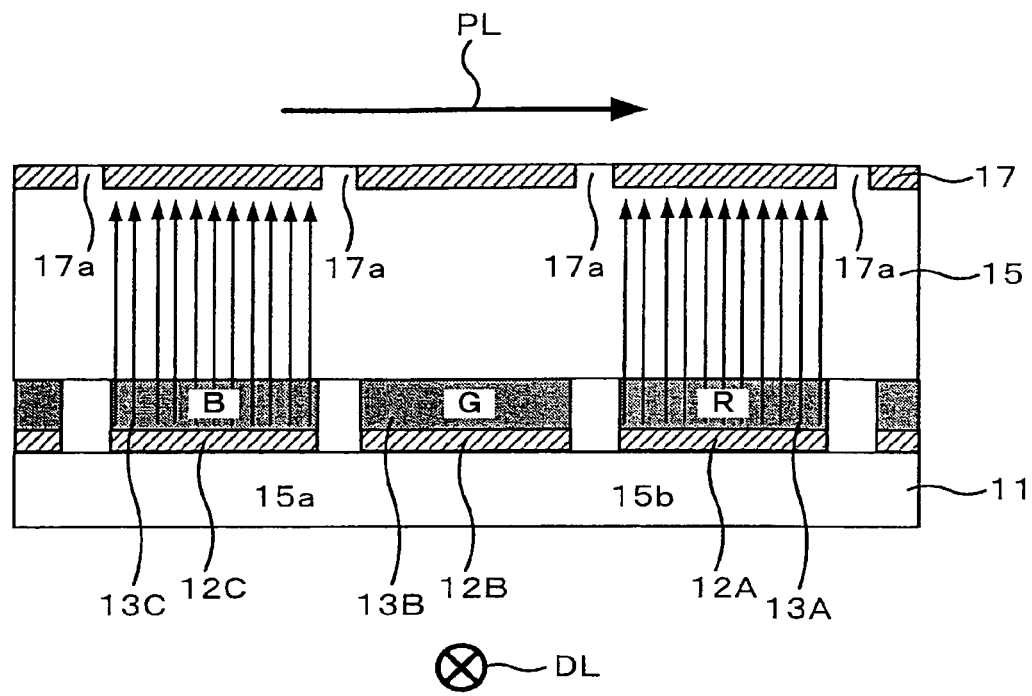
FIGS. 8A and 8B are diagrams illustrating electric fields generated by the pixel electrodes, with FIG. 8A showing the electric fields generated when the common electrode is provided with slits and FIG. 8B showing the electric fields generated when the common electrode is not provided with slits.

The slits 17a of the common electrode 17 control a decrease in displayed light quantity by the following operations. As shown in FIG. 8A, the slit 17a in the common electrode 17 can prevent the electric field directed toward the common electrode 17 from the pixel electrodes 12A in the pixel of the R filter 13A from expanding near the common electrode 17. In addition, the slit 17a of the common electrode 17 can prevent the electric field directed toward the common electrode 17 from the pixel electrodes 12C in the pixel of the B filter 13C from expanding near the common electrode 17. This can control the influences of the electric fields by the adjacent pixel electrodes on the arrangement of the liquid crystal molecules of the liquid crystal 15 in the pixels of the G filter 13B. As a result, the decrease in the light quantity of the light projected after being refracted by the PBS block is controlled.

Figure 9:
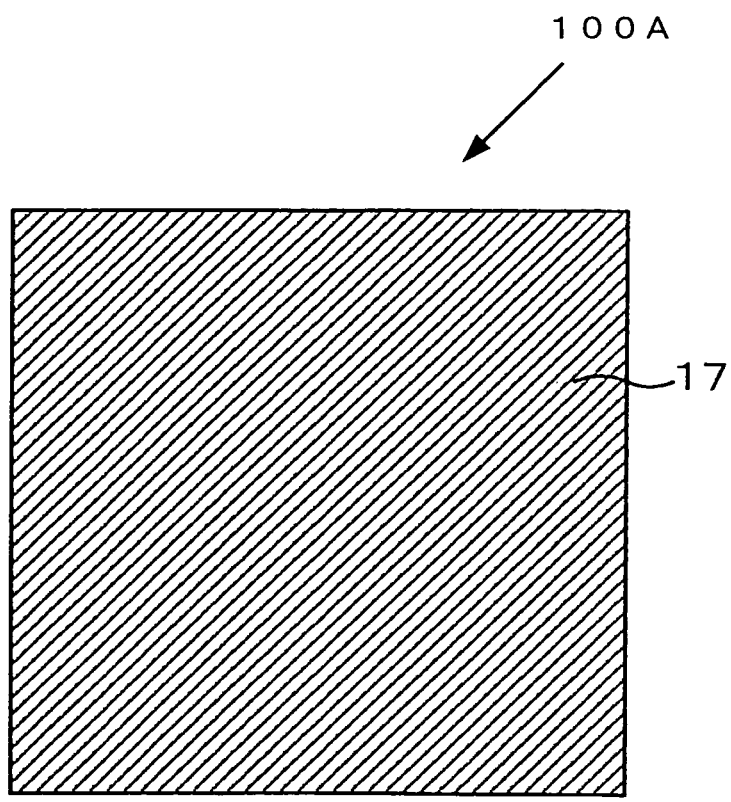
FIG. 9 is a diagram illustrating the common electrode in a comparative example of the second embodiment.
Figure 10:
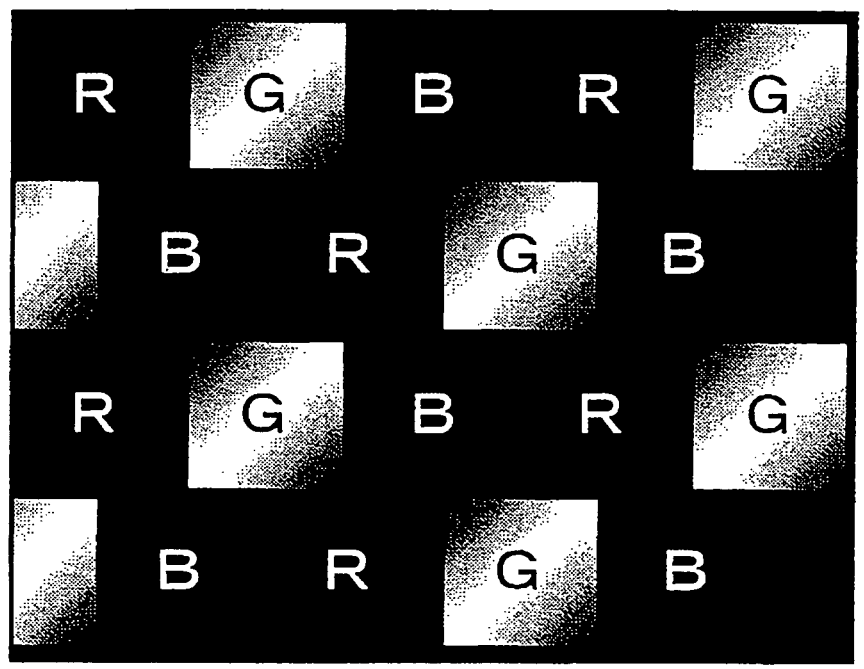
FIG. 10 is a diagram illustrating a display of the liquid crystal panel in the comparative example of the second embodiment.
Figure 11:
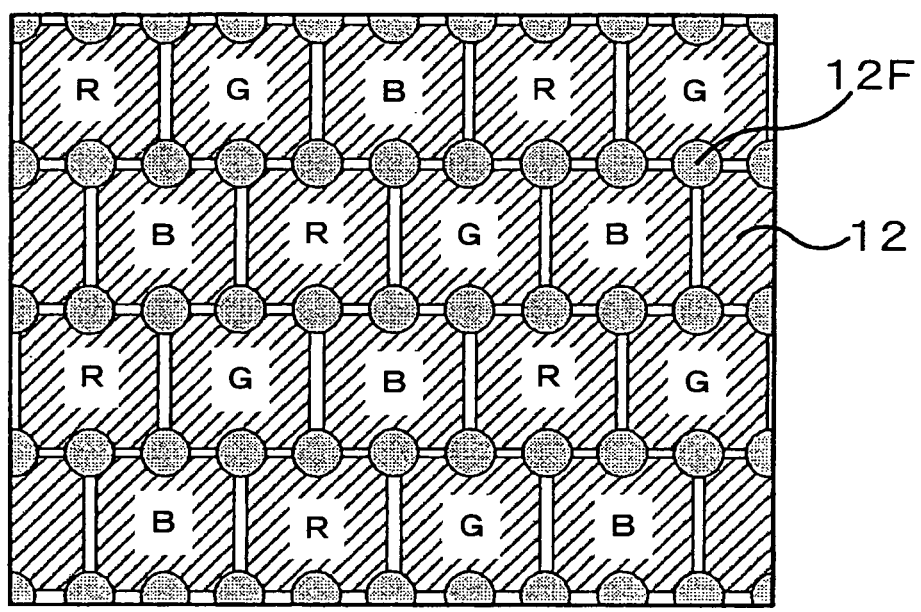
FIG. 11 is a diagram illustrating a modification of a transparent insulator layer in the first embodiment.

Referring to FIG. 9, a comparative example of the liquid crystal panel 1A according to the second embodiment is explained. The color filter 13 and the pixel electrode 12 in a liquid crystal panel 100A of this comparative example are similar to the color filter 13 and the pixel electrode 12 in the liquid crystal panel 1A of the second embodiment. As shown in FIG. 9, the liquid crystal panel 100A according to the comparative example includes the common electrode 17 that is free of slits. Therefore, the quantity of light that is radiated after being refracted by the PBS block around the upper left and lower right corners of the G filter 13B decreases as shown in FIG. 10.

Figure 8B:
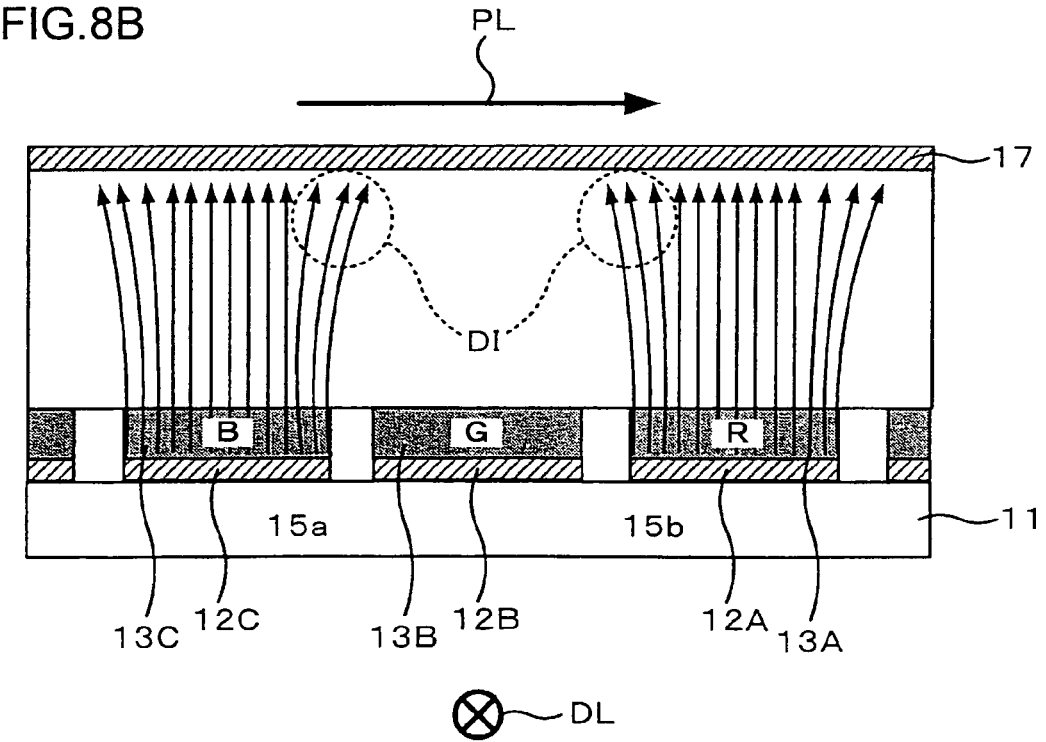

As shown in FIG. 8, the liquid crystal panel 100A according to the comparative example includes the common electrode 17 that is free of slits 17a. For this reason, the electric fields directed from the pixel electrode 12A in the pixel of the R filter 13A and the pixel electrode 12C in the pixel of the B filter 13C toward the common electrode 16, there is generated an inclined electric field DI that expands near the common electrode 17. The twisted arrangement of the liquid crystal molecules in the liquid crystal 15 in the pixel of the G filter 13B is broken up by the inclined electric field DI, and the light quantity of the reflected light on the polarization plane of the PBS block decreases.

According to the second embodiment as mentioned above, the following advantageous effects can be obtained.

(1) The slit 17a is formed in each of parts of the common electrode 17 along the upper left and lower right corners of each pixel electrode, i.e., in each of parts of the common electrode 17 along the corners of each pixel electrode that exist in the direction orthogonal to the rubbing direction (DL) in the alignment film 14 on the pixel electrode 12 side. This enables control of the influences of the electric fields caused by the adjacent pixel electrodes 12 on the arrangement of the liquid crystal molecules corresponding to the pixel.

(2) Even though the slits 17a are formed in the common electrode 17, conductivity is endowed between the common electrodes 17 of the adjacent pixels. This can prevent occurrence of a long loop current in the common electrode 17 and also prevent occurrence of turbulence of electric field applied to the liquid crystal 15.

—Modification—

The above-mentioned embodiments may be modified as follows.

(1) In the first embodiment, the transparent insulator layers 12E are formed in the upper left and lower right corner portions of each pixel electrode, i.e., areas of each pixel electrode on the sides in the direction-orthogonal to the rubbing direction of the alignment film 14 on the pixel electrode 12 side. However, the present invention is not limited to the first embodiment as far as the transparent insulator layers 12E are formed in areas on the sides in the direction orthogonal to the rubbing direction (DL) of at least the alignment film 14 on the pixel electrode 12 side.

For example, the transparent insulator layers 12F may be formed in areas on the sides in the direction orthogonal to the rubbing direction of the alignment film 14A on the pixel electrode 12 side so as to cover those parts of the pixel electrodes 12 that are considered to give influences on the electric field. That is, the transparent insulator layers 12F may be formed in areas of other pixel electrodes that are adjacent to the corners on the sides in the direction orthogonal to the rubbing direction. To be concrete, the transparent insulator layers 12F may be formed such that they cover corner portions that exist in the rubbing direction of the alignment film 14 on the pixel electrode 12 side or central parts of the upper and lower sides of the pixel electrode 12. By forming the transparent insulator layers 12F in the areas of the other pixel electrodes as mentioned above, the influences of the electric fields by the adjacent pixel electrodes 12 on the arrangement of the liquid crystal molecules corresponding to the pixel concerned can be further controlled.

Figure 12A:
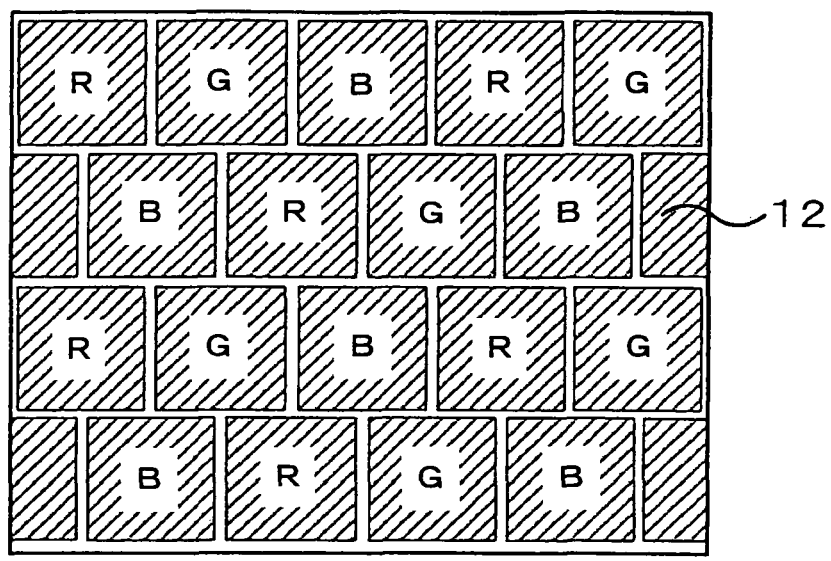
FIG. 12A is a diagram illustrating pixel electrodes in the second embodiment and FIG. 12B is a diagram illustrating a modification of slits formed in the common electrode according to the second embodiment.
Figure 12B:
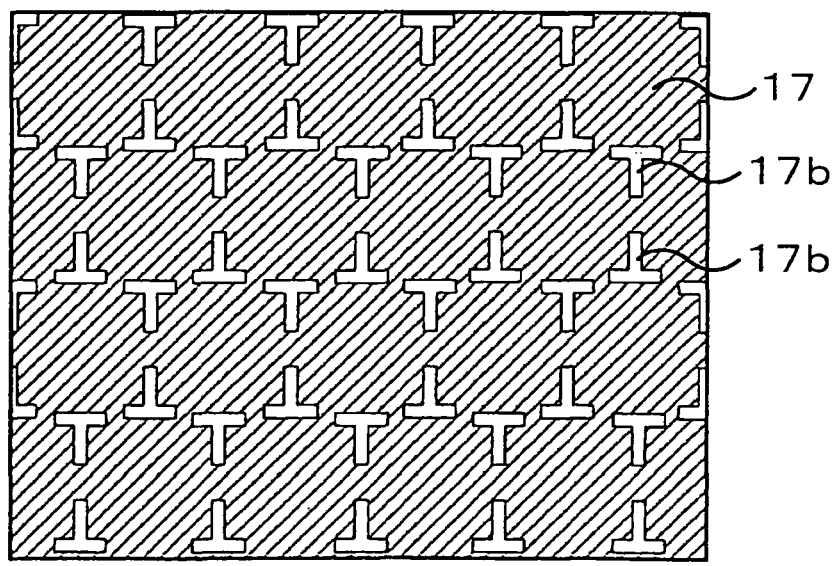

(2) In the second embodiment, the slits 17a are formed in the parts of the common electrode 17 along the upper left and lower right corners of each pixel electrode, i.e., parts of the common electrode 17 along the corners that exist in the direction orthogonal to the rubbing direction (DL) of the alignment film 14 on the pixel electrode 12 side. However, the present invention is not limited to the second embodiment as far as the transparent insulator layers 12E are formed in parts of the common electrode 17 along the corners that exist in the direction orthogonal to the rubbing direction (DL) of at least the alignment film 14 on the pixel electrode 12 side. For example, as shown in FIG. 12B, slits 17b may be formed in parts of the common electrode 17 along the corners that exist in the rubbing direction of the alignment film 14 on the pixel electrode 12. By forming the additional slits 17b in these parts, the occurrence of inclined electric fields DI in the direction orthogonal to the rubbing direction of the alignment film 14 on the pixel electrode 12 side can further be controlled.

Figure 13A:
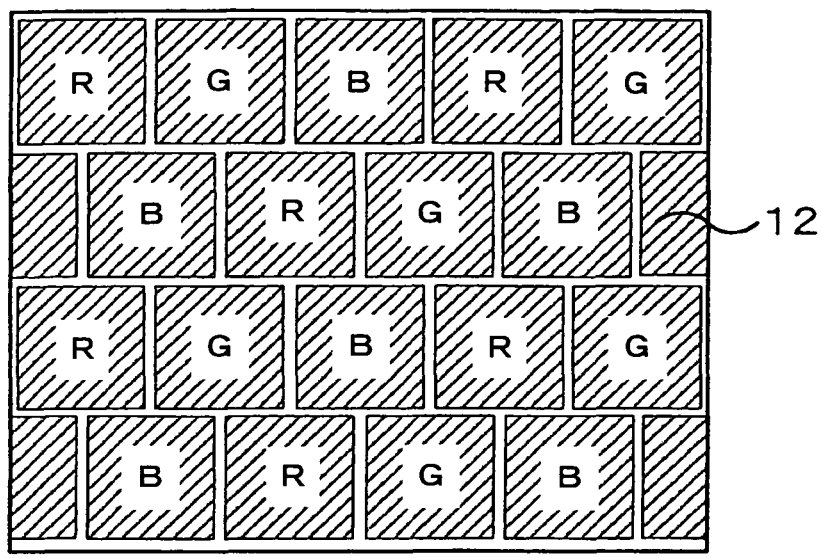
FIG. 13A is a diagram illustrating pixel electrodes according to the second embodiment and FIG. 13B is a diagram illustrating a modification of slits formed in the common electrode according to the second embodiment.
Figure 13B:
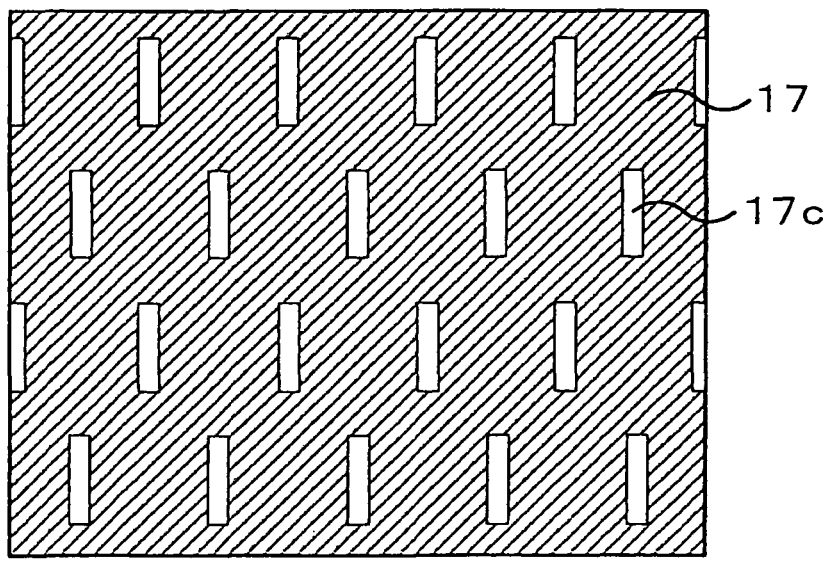

(3) In the second embodiment, the slits 17a are formed in parts of the common electrode 17 along the upper left and lower right corners of each pixel electrode, i.e., parts of the common electrode 17 along the corners of each pixel electrode that exist in the direction orthogonal to the rubbing direction of the alignment film 14 on the pixel electrode 12 side. However, the present invention is not limited to the second embodiment as far as slits are formed at least along a part of sides of each pixel electrode 12. For example, slits 17c may be formed along a part of each of right and left sides, respectively, of the pixel electrode 12 as shown in FIG. 13B. Also in this case, the expansion of the generated electric fields from the pixel electrodes 12 can be controlled. Even though the slits 17c are formed in the common electrode 17 in order to prevent the occurrence of turbulence of electric fields to be applied to the liquid crystal because of generation of a loop current in the common electrode 17, conductivity is endowed between the common electrodes 17 of the adjacent pixels.

(4) In the second embodiment, transparent insulator layers 12E are formed in super position to the pixel electrodes 12. However, instead of forming the transparent insulators 12E, it is also possible not to form the pixel electrodes 12 at parts that correspond to the parts where the transparent insulator layers 12E are to be formed. Moreover, instead of forming the transparent insulator layers 12E in super position to the pixel electrodes 12, it is also possible to form a pixel electrode and a transparent insulator layer as one layer. This also enables control of the influences of the electric fields by the pixel electrodes of the adjacent pixels on the arrangement of the liquid crystal molecules of the liquid crystal 15 in the pixels.

(5) In the second embodiment, slits 17a are formed in the common electrode 17. However, it is also possible to form transparent insulator layers on a surface of the common electrode 17 on the pixel electrode 12 side at positions where the slits 17a are to be formed instead of forming the slits 17a. This also enables control of the influences of the electric fields caused by the adjacent pixel electrodes 12 on the arrangement of the liquid crystal molecules corresponding to the pixel.

(6) Although the liquid crystal panel is used in combination with the PBS block, it may also be configured such that the liquid crystal panel has polarization plates in stead of the PBS block.

Figure 14:
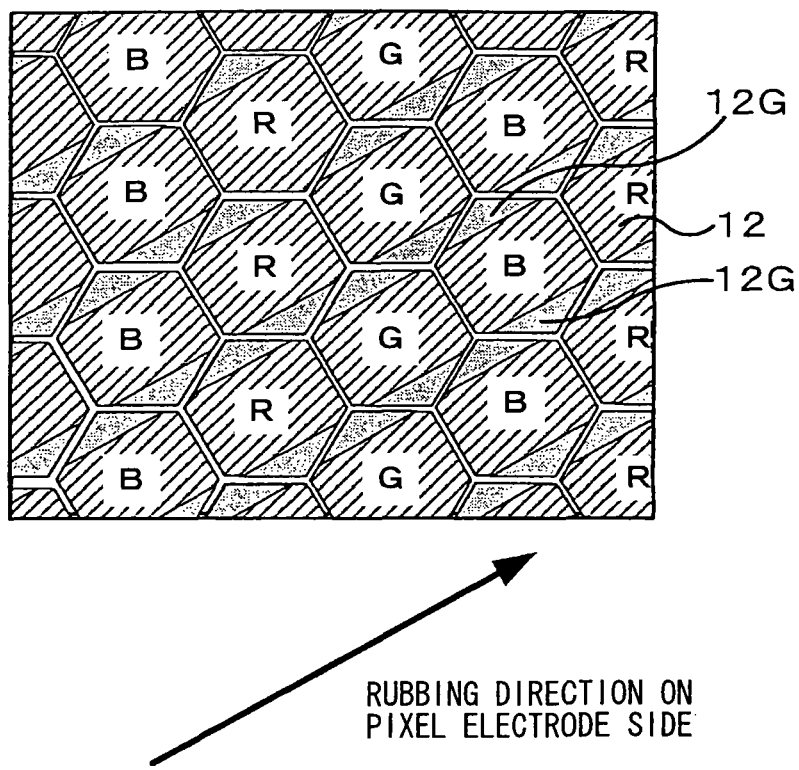
FIG. 14 is a diagram illustrating the transparent insulator layers in the case where the shape of the pixel electrodes is hexagonal.
Figure 15A:
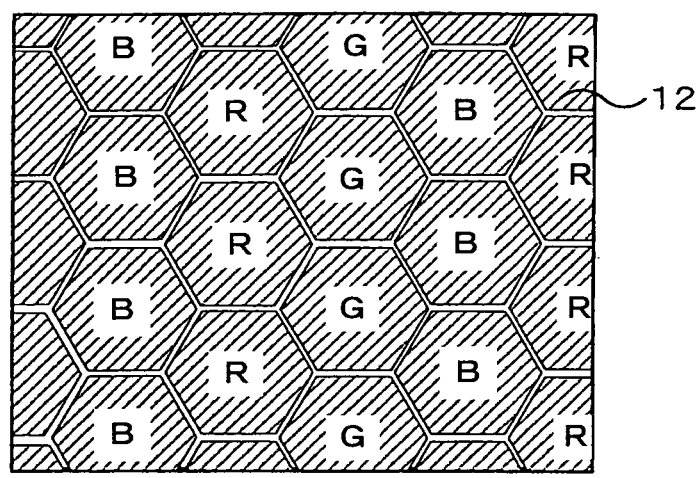
FIG. 15A is a diagram illustrating pixel electrodes each having a hexagonal shape and FIG. 15B is a diagram illustrating slits formed in the common electrode in the case where the shape of the pixel electrodes is hexagonal.
Figure 15B:
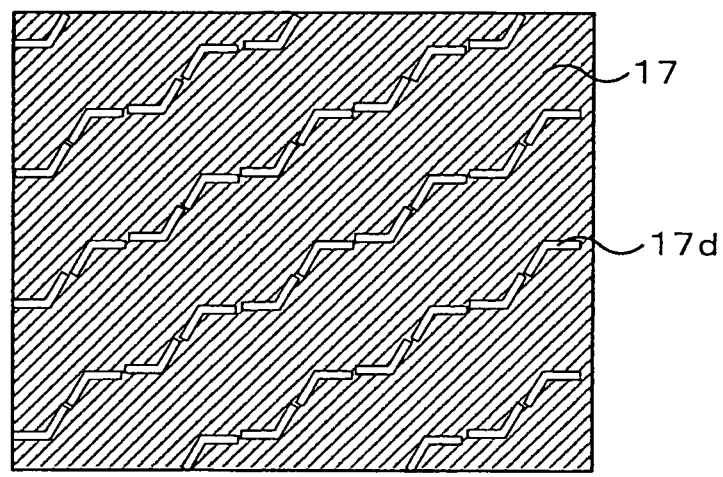
Figure 15B:
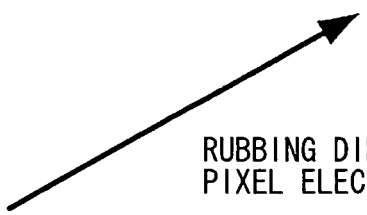

(7) The shape of the pixel electrodes 12 in the liquid crystal panels 1 and 1A according to the above-mentioned embodiments is square. However, the present invention is not limited to the above-mentioned embodiments as far as the pixel electrodes 12 have a shape that allows arrangement of the pixel electrodes in parallel without spaces between them. For example, the pixel electrodes 12 may be rectangular. Alternatively, the pixel electrodes 12 may be hexagonal as shown in FIGS. 14 and 15A. Also in this case, at least transparent insulator layers 12G are formed in the corner parts of the pixel electrodes 12 that exist in the direction orthogonal to the rubbing direction of the alignment film 14 on the pixel-electrode 12 side as shown in FIG. 14. Moreover, as shown in FIG. 15B, slits 17d are formed in parts of the common electrode 17 along the corners of each pixel electrode 12 that exist in the direction orthogonal to the rubbing direction of the alignment film 14 on the pixel electrode 12 side. Similarly to the shape of the pixel electrodes, the shape of the pixels is not limited to those in the embodiments as far as it allows the pixels to be arranged substantially without spaces in the liquid crystal panel. For example, the shape of the pixel may be rectangular or hexagonal.

Figure 16A:
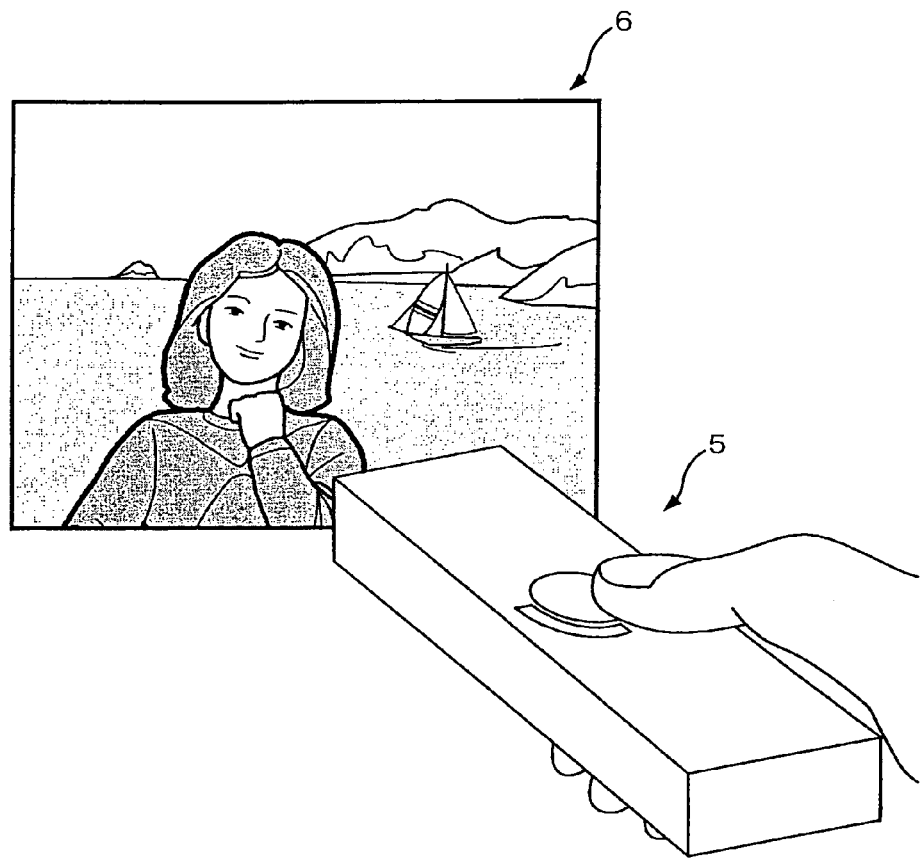
FIGS. 16A and 16B are diagrams illustrating a projector that includes the liquid crystal panel of the present invention.
Figure 16B:
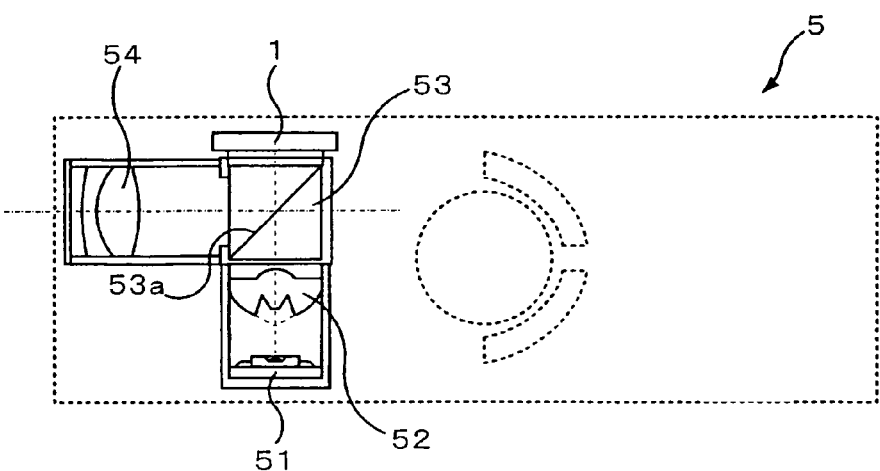

(8) It is preferred that the liquid crystal panels 1 and 1A according to the above-mentioned embodiments are used in portable projectors, for example, the projector 5 shown in FIG. 16A. Reference numeral 6 designates a projected image projected by the projector 5. Referring to FIG. 16B, the projector 5, which is an example of a portable projector, will be explained. The projector 5 includes a light source 51, a condensation optical system 52, a PBS block 53, the liquid crystal panel 1, and a projection optical system 54. In the projector 5, a driving current is supplied to the LED light source 51 through a harness and a pattern, both of which are not shown. The LED light source 51 radiates light to the condensation optical system 52 at a brightness corresponding to the supplied electrical current. The condensation optical system 52 makes the LED light substantially parallel and radiates the substantially parallel light into the PBS block 53. The light flux that has entered into the PBS block 53 is transmitted through the polarization plane 53a of the PBS block 53 and illuminates the liquid crystal panel 1. The light that has illuminated the liquid crystal panel 1 is reflected by the liquid crystal panel 1 and then enters the PBS block 53 again. The light that has entered the PBS block 53 is reflected by the polarization plane 53a, and is radiated toward the projection optical system 54 as a projected light. The light flux that has entered the projection optical system 54 is radiated in front of the projector. Moreover, the liquid crystal panels 1 and 1A of the present invention can be applied also to electronic viewfinders and head mounted displays.

Third Embodiment

Hereinafter, a third embodiment of the present invention will be explained with reference to the attached drawings. It is to be noted that the same reference numerals are assigned to components similar to those in the first embodiment described above and that the following explanation focuses on differences from the first embodiment. The structures and functions not particularly described are similar to what is described in the first embodiment or the second embodiment.
—Liquid Crystal Panel—
The liquid crystal panel according to the third embodiment includes pixels (hereafter, referred to as "subpixels") that emit a white light and are each provided between the pixels equipped with color filters. This makes it possible to prevent a decrease in brightness of a display of the liquid crystal panel due to influences of the electric fields between the pixels.

Figure 17:
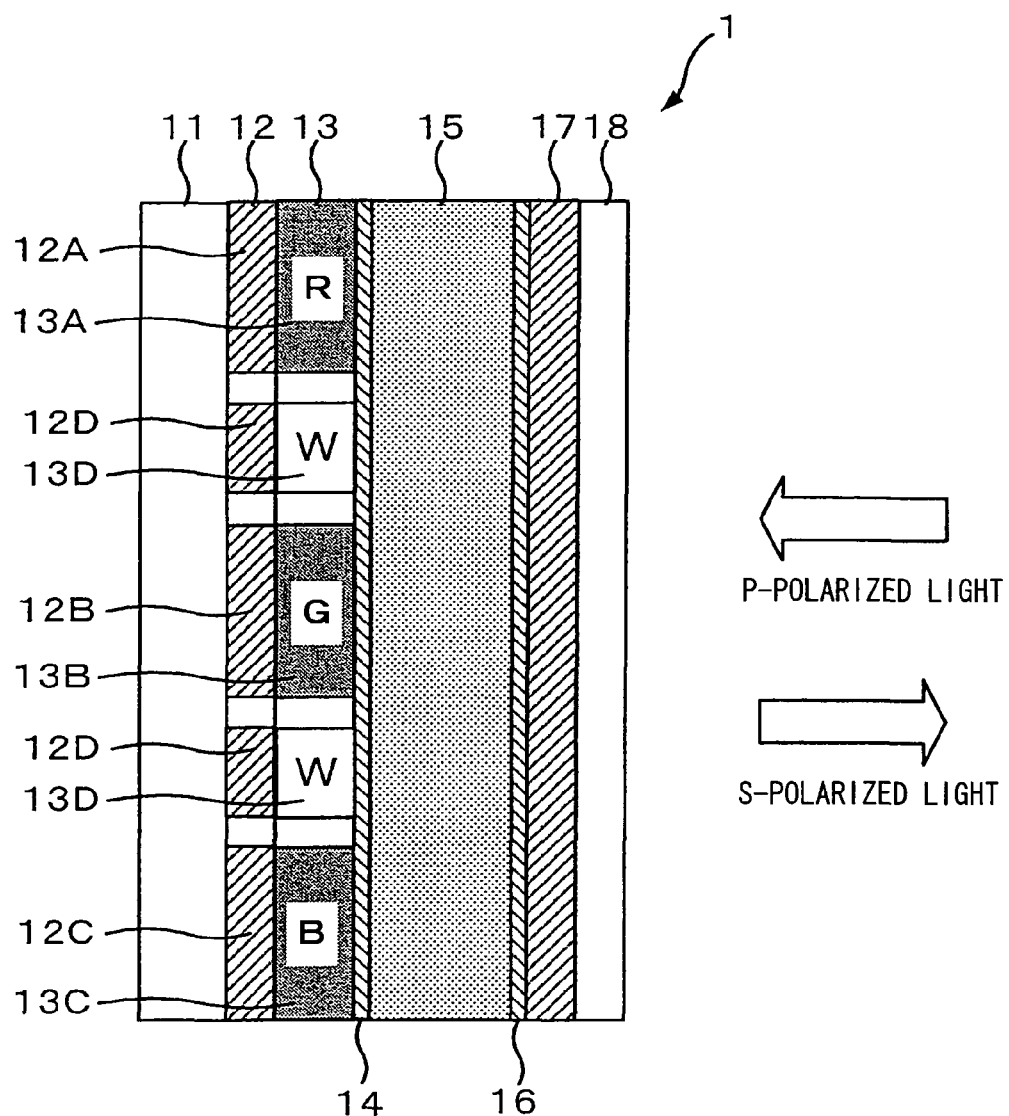
FIG. 17 is a diagram illustrating the structure of a liquid crystal panel according to a third embodiment of the present invention.

FIG. 17 is a diagram illustrating the structure of the liquid crystal panel 1 according to a third embodiment of the present invention. The liquid crystal panel 1 shown in FIG. 17 includes the components similar to those of the liquid crystal panel 1 of the first embodiment shown in FIG. 1. In the following explanations, the component indicated by reference numeral 13 is called a color filter assembly.

Figure 18A:
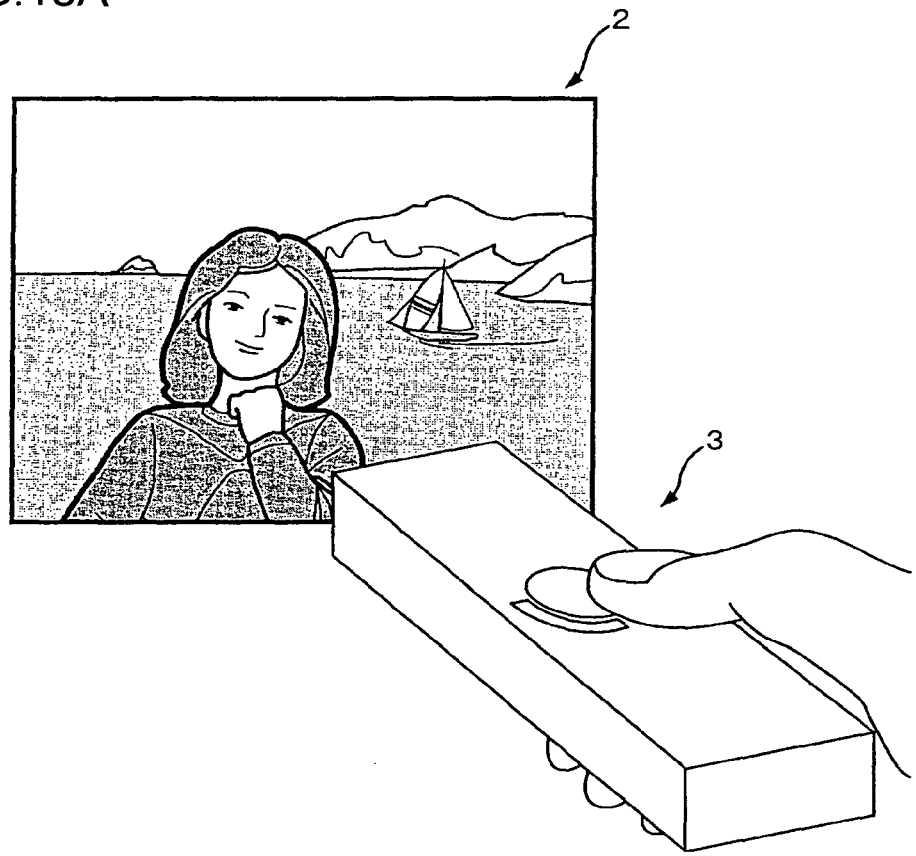
FIGS. 18A and 18B are diagrams illustrating a projector that includes the liquid crystal panel of the present invention.
Figure 18B:
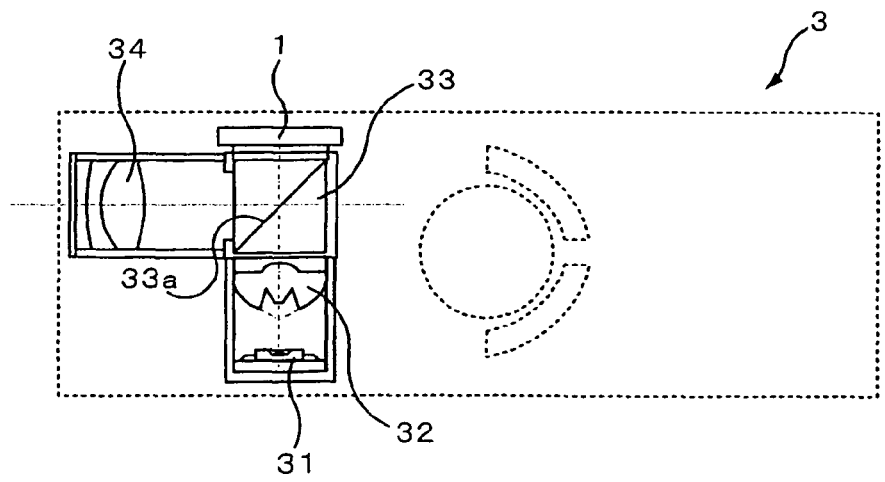

Hereafter, explanation is made on an example in which the liquid crystal panel 1 is equipped in a projector. FIG. 18A is a diagram illustrating a projector 3 that includes the liquid crystal panel 1. Reference numeral 2 indicates a projected image that is projected by the projector 3. Referring to FIG. 18B, the projector 3 is explained. The projector 3 includes a light source 31, a condensation optical system 32, a PBS (Polarizing Beam Splitter) block 33, the liquid crystal panel 1, and a projection optical system 34. In the projector 3, a driving current is supplied to the LED light source 31 through a harness and a pattern, both of which are not shown. The LED light source 31 illuminates the condensation optical system 32 at a brightness corresponding to the supplied electrical current. The condensation optical system 32 makes the LED light substantially parallel and radiates the substantially parallel light into the PBS block 33. Of the light fluxes that have been incident to the PBS block 33, a P-polarized light is transmitted through the PBS block 33 and illuminates the liquid crystal panel 1. The radiated light is reflected by the liquid crystal panel 1. The reflected light that has been reflected by the liquid crystal panel 1 enters the PBS block 33. The incident light is an S-polarized light, which is reflected by the polarization plane 33a of the PBS block 33 and radiated toward the projection optical system 34 as a projected light. The light flux that has entered the projection optical system 34 is projected in front of the projector.

The color filter assembly 13 is an assembly of a plurality of color separation filters that resolve the incident light to a plurality of color components and a plurality of white filters. The color filter assembly 13 is formed by a process of photolithography. The color filter assembly 13 includes a red (R) filter 13A that transmits only a red light, a green (G) filter 13B that transmits only a green light, a blue (B) filter 13C that transmits only a blue light, and a white (W) filter that transmits all the color lights. The shapes of the R filter 13A, G filter 13B, and B filter 13C are hexagons (see FIG. 19A). Hereafter, the filters 13A to 13C are referred to as color filters generically. The shape of the white filter 13D is a parallelogram (see FIG. 19A). The color filters 13A to 13C and the white filter 13D are formed on each of the pixel electrodes 12.

Figure 19A:
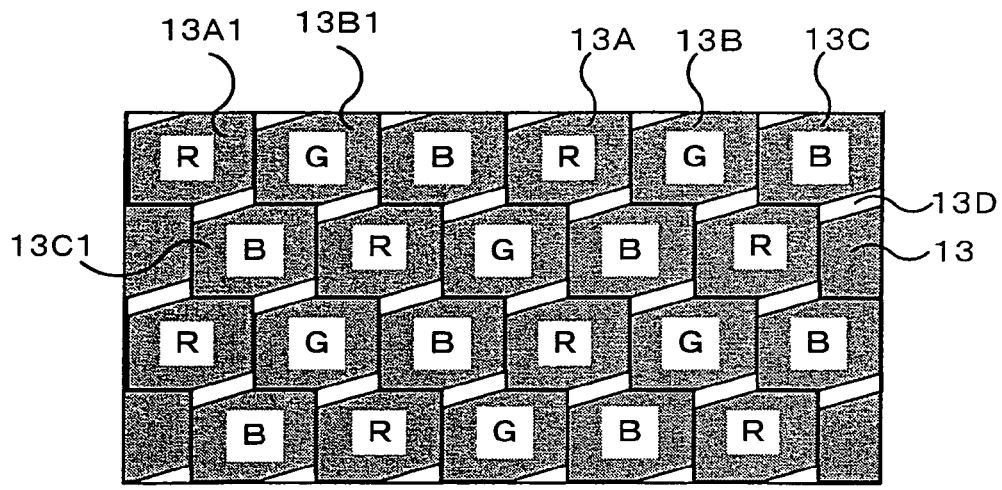
FIGS. 19A to 19C are diagrams illustrating the rubbing directions of alignment films according to the third embodiment of the present invention, with FIG. 19A showing an example of arrangement of the color filters in the liquid crystal panel, FIG. 19B showing the rubbing direction of the alignment film on the color filter side, and FIG. 19C showing the rubbing direction of the alignment film on the common electrode side.

The color filters 13A to 13C are in a delta array as shown in FIG. 19A. That is, the R filter 13A, the G filter 13B, and the B filter 13C are arranged so that each center position thereof together may define a triangle. More particularly, one pixel includes one color filter 13A1, one color filter 13B1, and one color filter 13C1 as well as the TFT device-formed Si substrate 11, the pixel electrode 12, the alignment film 14, the liquid crystal 15, the alignment film 16, the common electrode 17, and the glass substrate 18, each corresponding to each of the color filters 13A1, 13B1, and 13C1. All the colors can be reproduced with a single pixel by combining lights that are transmitted through the R filter 13A, the G filter 13B, and the B filter 13C, respectively, based on the principle of additive color mixing. A single rectangular filter has a longer direction (horizontal direction in FIG. 19A) dimension of, for example, 10 μm and a shorter direction (vertical direction in FIG. 19A) dimension of, for example, 7.5 μm.

The white filters 13D is arranged such that the longer sides thereof are adjacent to sides of the color filters 13A to 13C in a predetermined direction. One subpixel includes one white filter 13D and the TFT device-formed Si substrate 11, the pixel electrode 12, the alignment film 14, the liquid crystal 15, the alignment film 16, the common electrode 17, and the glass substrate 18, each corresponding to the white filter 13D. The pixel of the R filter 13A is called "R pixel", the pixel of the G filter is called "G pixel", and the pixel of the B filter 13C is called "B pixel". The liquid crystal panel 1 is constituted as an assembly of the R, G, and B pixels and subpixels.

The principle in which each pixel in the liquid crystal panel 1 is made displayed/non-displayed on the projection plane will be explained with reference to FIG. 17. When the pixel of the liquid crystal panel 1 is to be displayed on the projection plane, the pixel electrode 12 is not charged. In this case, the liquid crystal molecules in the liquid crystal 15 are in a 45°-twisted arrangement.

When the light from the LED light source 31 is radiated into the PBS block 33, only the P-polarized light is incident to the liquid crystal panel 1. The P-polarized light is transmitted through the glass substrate 18, the common electrode 17, and the alignment film 16. Thereafter, the P-polarized light is transmitted through the liquid crystal 15, the alignment film 14, and the color filters (white filter) 3A to 13C (13D) and is reflected by the pixel electrode 12.

The light reflected by the pixel electrode 12 finally becomes an S-polarized light having an oscillation direction rotated by 90° with respect to the oscillation direction of the incident P-polarized light due to the twisted arrangement of the liquid crystal molecules in the liquid crystal 15. The P-polarized light is reflected on the polarization plane 33a, and is radiated from the projector 3.

On the other hand, when the pixel of liquid crystal panel 1 is not to be displayed on the projection plane, the reflection pixel electrode 12 is charged. At this time, the liquid crystal molecules in the liquid crystal 15 are arranged in the direction of the electric field. In this case, the oscillation direction of the P-polarized light that has been reflected by the liquid crystal panel 1 is not rotated by 90°, so that the light reflected by the liquid crystal panel 1 is a P-polarized light, which is transmitted through the PBS block without being reflected on the polarization plane 33a of the PBS block, so that it is not radiated from the projector 3.

As mentioned above, control of the supply of charges in the pixel electrode 12 enables reproduction of all the colors by a single pixel, for example, by allowing only the R pixel to be displayed on the projection plane, by allowing only the R pixel and the G pixel to be displayed on the projection plane, or the like. Similarly, for the subpixel, control of the supply of charges in the pixel electrode 12 enables switching of display/non-display of the subpixel on the projection plane.

Referring to FIGS. 19A to 21, the control unit that controls the influences on a respective pixel of the electric field by pixel electrodes that are adjacent to the respective pixel is described. In this embodiment, explanation is made on the case where only the pixel of the G filter 13B is displayed on the projection plane but the R and B pixels are not displayed. In this case, the pixel electrodes 12 in the R pixel and the B pixel, respectively, are charged but the pixel electrode 12 in the G pixel is not charged.

Figure 19B:
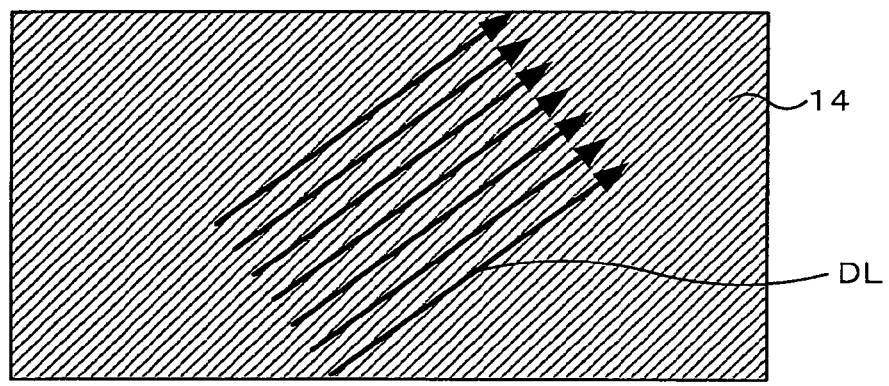
Figure 19C:
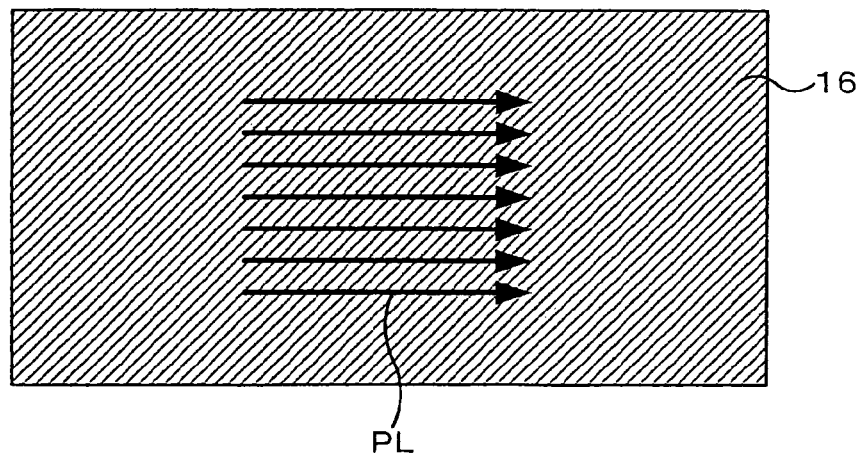

FIG. 19A is a diagram illustrating the color filter assembly 13 in the third embodiment of the present invention. The shape of the color filters 13A to 13C is a hexagon as mentioned above and the color filters 13A to 13C are in a delta array. The shape of the white filter 13D is a parallelogram, and the white filter 13D is arranged so that the longer sides thereof may contact the sides in the predetermined direction of the color filters 13A to 13C. FIG. 19B is a diagram illustrating the rubbing direction of the alignment film 14 on the pixel electrode 12 side in the embodiment of the present invention. The rubbing direction of the alignment film 14 on the pixel electrode 12 side is the direction of a diagonal line (DL) going from the lower left to the upper right of the color filters 13A to 13C. FIG. 19C is a diagram illustrating the rubbing direction of the alignment film 16 on the common electrode 17 side in the third embodiment of the present invention. The rubbing direction of the alignment film 16 on the common electrode 17 side is a direction (PL) at an angle of 45° to the rubbing direction of the alignment film 14.

The longer sides of the white filter 13D are arranged so as to contact the sides of the color filters 13A to 13C, located in a direction substantially orthogonal to the rubbing direction (DL) of the alignment film 14 on the pixel electrode 12 side as shown in FIGS. 19A and 19B. The orientation of the longer sides of the white filter 13D is the same as the rubbing direction (DL) of the alignment film 14 on the pixel electrode 12 side.

Figure 20:
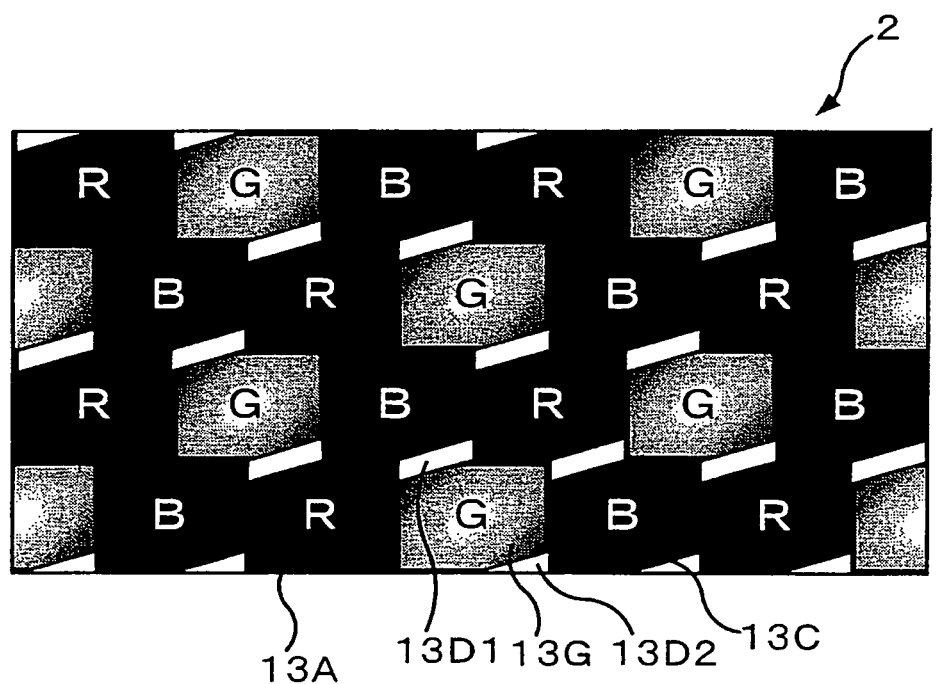
FIG. 20 is a diagram illustrating pixels projected on a projection plane in the third embodiment.

FIG. 20 is an enlarged view of a projected image 2 that is projected on the projection plane. The displayed light quantity of the G pixel is reduced because of the influences of the supplied electric charges in the pixel electrodes of the adjacent R pixel and B pixel (see FIG. 21B to be detailed later).

However, the reduction of luminance in the display of G pixel can be controlled by causing the subpixels of the white filters 13D1 and 13D2 whose longer sides are in contact with the G filter 13B to emit light.

Figure 21A:
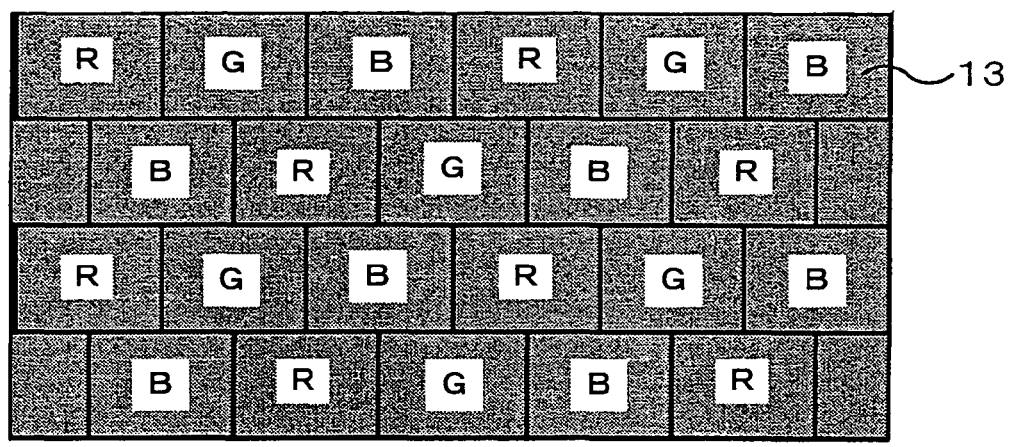
FIG. 21A and FIG. 21B are diagrams illustrating a comparative example of the third embodiment, with FIG. 21A illustrating a color filter assembly and FIG. 21B being a diagram illustrating an example of a display of the liquid crystal panel.
Figure 21B:
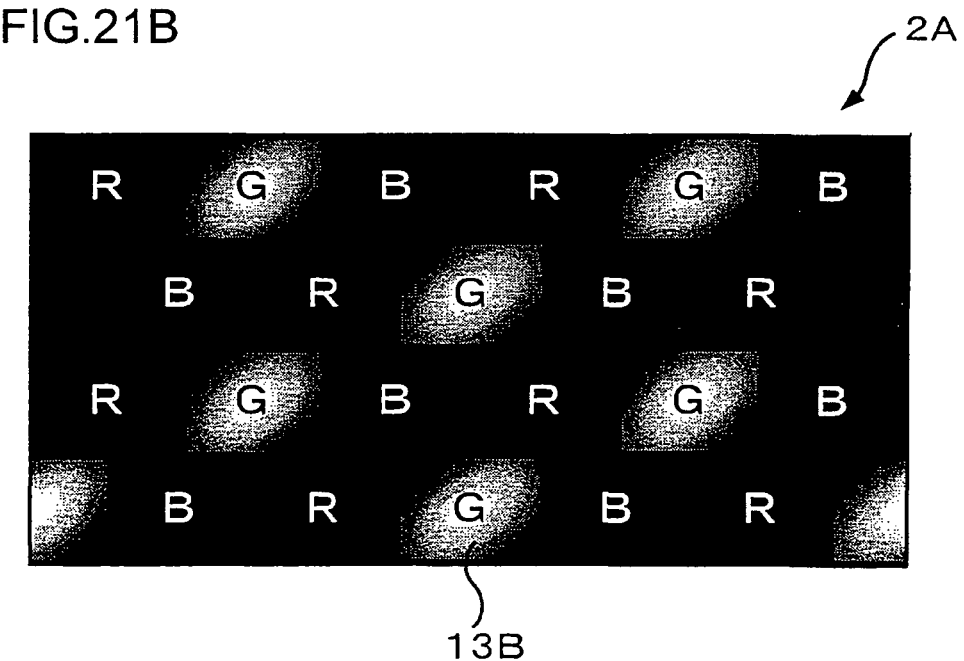

Referring to FIGS. 21A and 21B, a comparative example of the liquid crystal panel 1 according to the third embodiment of the present invention is explained. Hereafter, explanation is made assuming that the rubbing direction of the alignment films 14 and 16 in the liquid crystal panel 1A of the comparative example is identical with the rubbing direction of the liquid crystal panel 1 in the third embodiment. FIG. 21A is a diagram illustrating the color filter assembly 13 in the comparative example. The color filters have each a rectangular shape, and no white filter is formed in the color filter assembly 13. In this case, the displayed light quantity of the pixel decreases around the upper left and lower right corners of the G filter 13B as shown in an enlarged view of the projected image 2A in FIG. 21B and thus the displayed light quantity of the pixel is decreased.

Figure 22A:
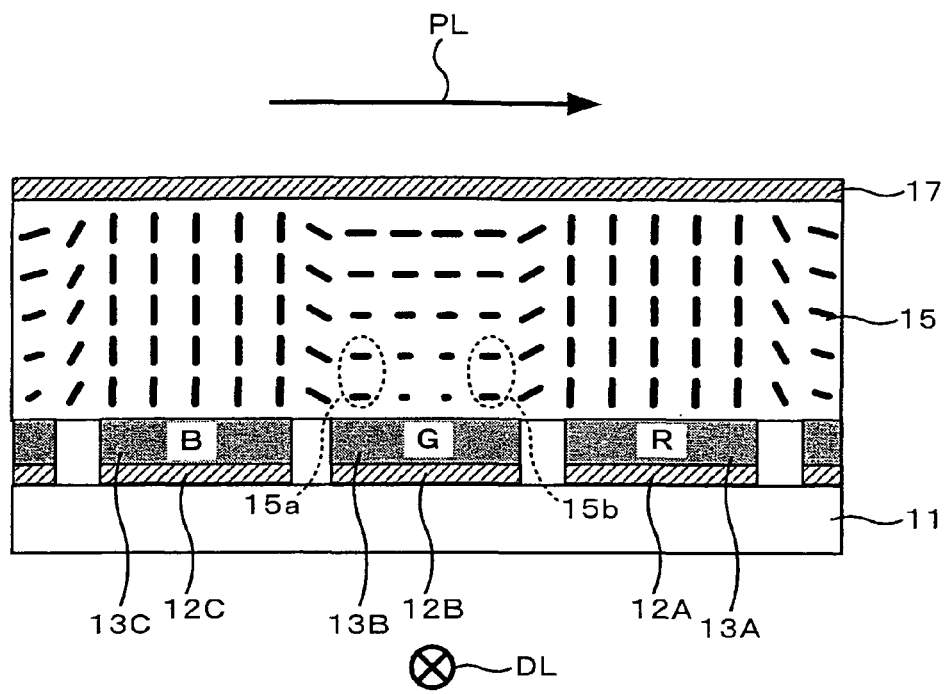
FIG. 22A and FIG. 22B are diagrams illustrating the arrangement of liquid crystal molecules, with FIG. 22A showing the arrangement of liquid crystal molecules in a comparative example of the third embodiment and FIG. 22B showing the arrangement of liquid crystal molecules in the third embodiment.

In the liquid crystal panel 1A of the comparative example, the displayed light quantity is decreased by the following operations. In the case where the pixels of the R filter 13A and the B filter 13C are not to be allowed to emit light, the pixel electrodes 12A and 12C are charged to align the liquid crystal molecules in a direction from the pixel electrodes 12A and 12C toward the common electrode 17 as shown in FIG. 22A. The electric fields generated by the pixel electrodes 12A and 12C are directed toward the pixel electrode 12B of the G pixel as well as toward the common electrode 17. Therefore, a 45°-twisted array of the liquid crystal molecules 15a and 15b of the pixel electrode 12B near the G pixel is broken up. As a result, for the lights that have been incident near the R filter 13A and the B filter 13C, among the lights that have been incident to the G filter 13B, the oscillation direction is not rotated by 90°, so that the displayed light quantity of the G pixel is decreased. In corner parts of the G pixel on the sides in the direction substantially orthogonal to the rubbing direction (DL) on the pixel electrode 12B side, the electric fields from the two pixels that are in contact with the corners are combined to generate a strong electric field in a direction substantially orthogonal to the rubbing direction (DL), so that the extent in which the 45°-twisted array of the liquid crystal molecules is broken up is enlarged. This would cause the displayed light quantity of the pixel to decrease around the upper left and lower right corners of the G filter 17B as shown in FIG. 21B.

Figure 22B:
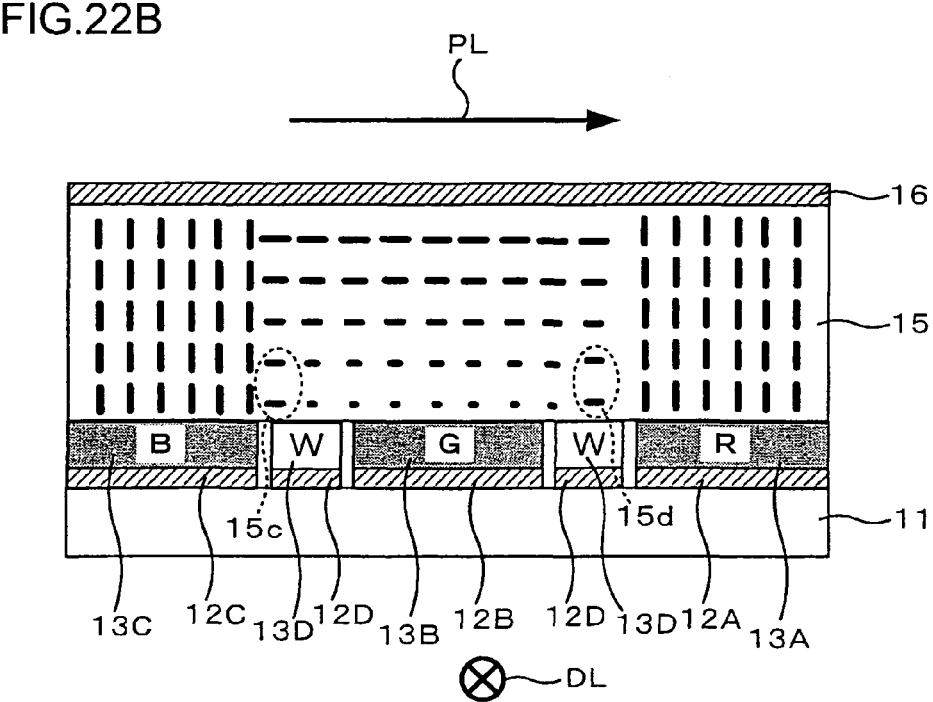

In the third embodiment of the present invention, the level of a reduction in displayed light quantity of the G pixel is small as compared with the comparative example. This would be due to provision of the pixel electrode 12D of the white filter 13B between the pixel electrode 12A of the R pixel and the pixel electrode 12C of the B pixel as shown in FIG. 22B, which is considered to alleviate the influences of the electric fields on the G pixel from the pixel electrodes 12A and 12C of the R pixel and the B pixel, respectively. In other words, the subpixel plays the role of an electric field alleviation area between the pixels. For example, in FIG. 22B, the liquid molecules near the pixel electrode 12D of the white filter 13D are influenced by the electric fields from the pixel electrode 12A of the R pixel and the pixel electrodes 12C of the B pixel. However, because of the arrangement of the white filter 13D and the pixel electrode 12D, the spacing between the pixel electrode 12A and the pixel electrode 12C increases and the liquid crystal molecules on the pixel electrode 12B of the G pixel are less influenced by the pixel electrode 12A of the R pixel and the pixel electrode 12C of the B pixel.

—Liquid Crystal Panel Device—

Figure 24:
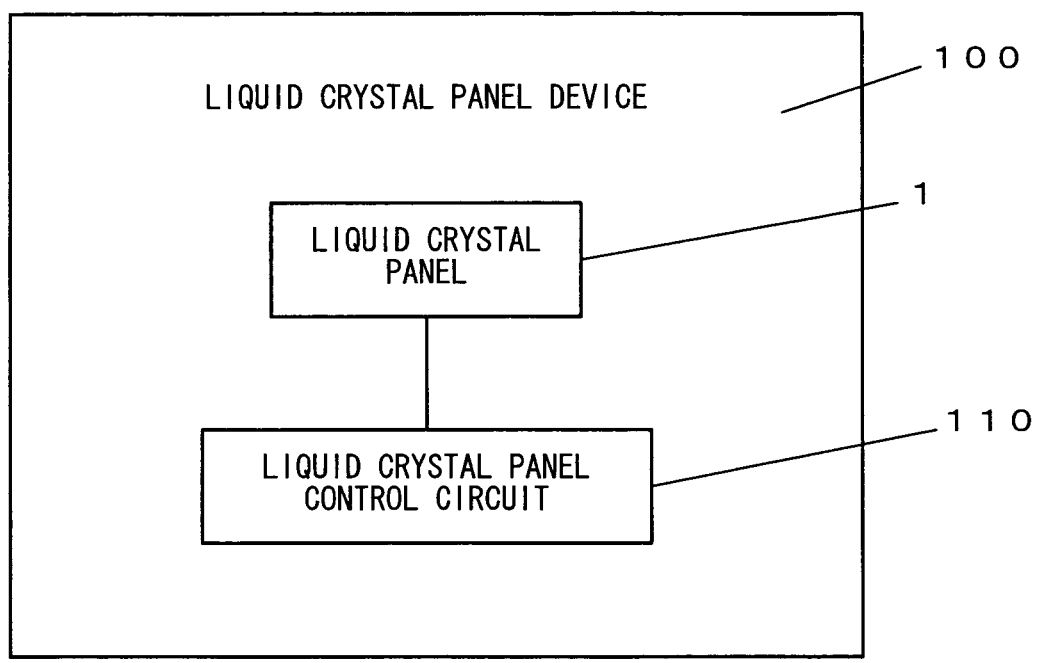
FIG. 24 is a diagram illustrating a liquid crystal panel device according to the third embodiment of the present invention.

Referring to FIG. 24, a liquid crystal panel device 100 according to the third embodiment of the present invention will be explained. The liquid crystal panel device 100 includes the liquid crystal panel 1 and a liquid crystal panel control circuit 110. The liquid crystal panel control circuit 110 outputs a driving signal to the liquid crystal panel 1 and controls the pixels and the subpixels. As a result, the liquid crystal panel 1 generates an image according to the driving signal.

Figure 25:
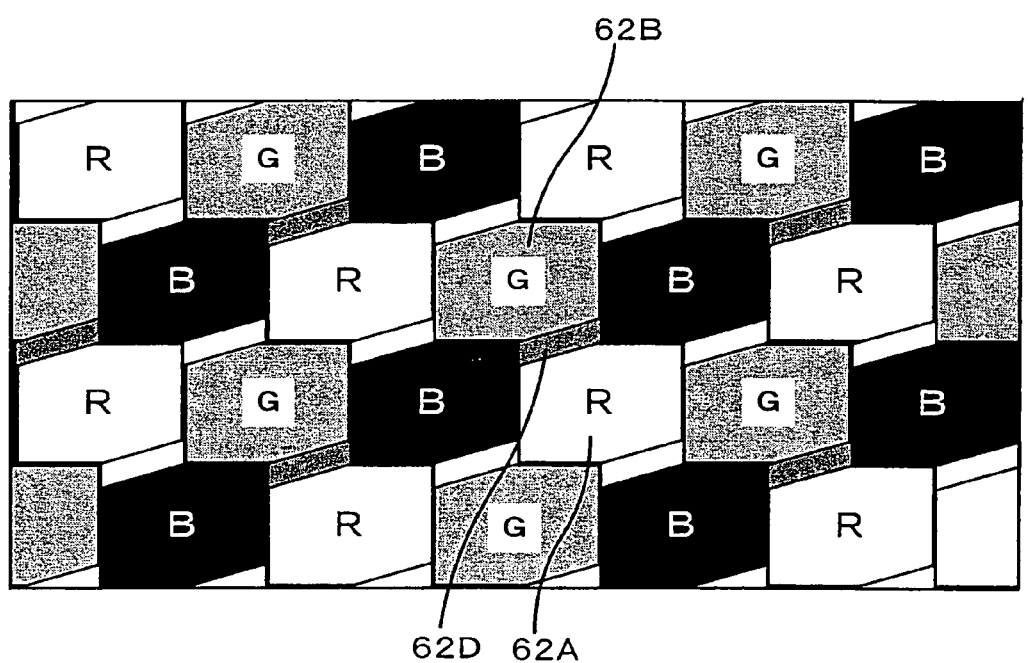
FIG. 25 is a diagram illustrating an example of gradation of brightness in a display of subpixels.

Now, referring to FIGS. 25 to 28, control of subpixels by the liquid crystal panel control circuit 110 will be described. As shown in FIG. 25, the liquid crystal panel control circuit 110 renders the gradation of brightness of the subpixel 62D sandwiched by the two color pixels 62A and 62B equal to or less than each of the gradations of brightness of the two color pixels 62A and 62B when displays of the two adjacent color pixels 62A and 62B sandwiching the subpixel 62D are other than black displays (i.e., gradation of brightness is 0). This makes it possible to prevent the display of the liquid crystal panel 1 from becoming paler by displaying the subpixel 62D. For example, when the gradation of the color pixel 62A is 100 and the gradation of the color pixel 62B is 200, the liquid crystal panel control circuit 110 sets the gradation of the subpixel 62D to a value of 100 or less.

Figure 26:
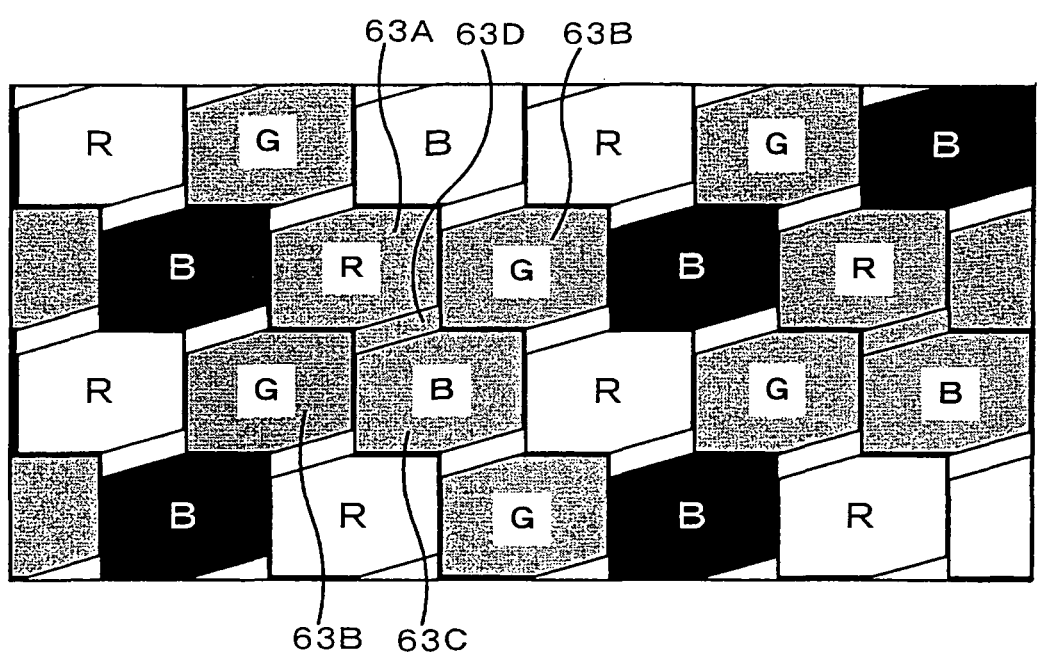
FIG. 26 is a diagram illustrating an example of gradation of brightness in a display of subpixels.

As shown in FIG. 26, when the three color pixels surrounding the subpixel 63D are pixels 63A to 63C of the three color filters 13A to 13C and the gradations of brightness of the color pixels 63A to 63C are equal to each other, the liquid crystal panel control circuit 110 sets the gradation of the brightness of the subpixel 63D to the same value as them. As a result, the balance of the brightness of the subpixel 63D with respect to the surrounding color pixels 63A to 63C can be maintained. For example, when the gradations of the color pixels 63A to 63C are 100, the liquid crystal panel control circuit 110 adjusts the gradation of the subpixel 62D to 100.

Figure 27:
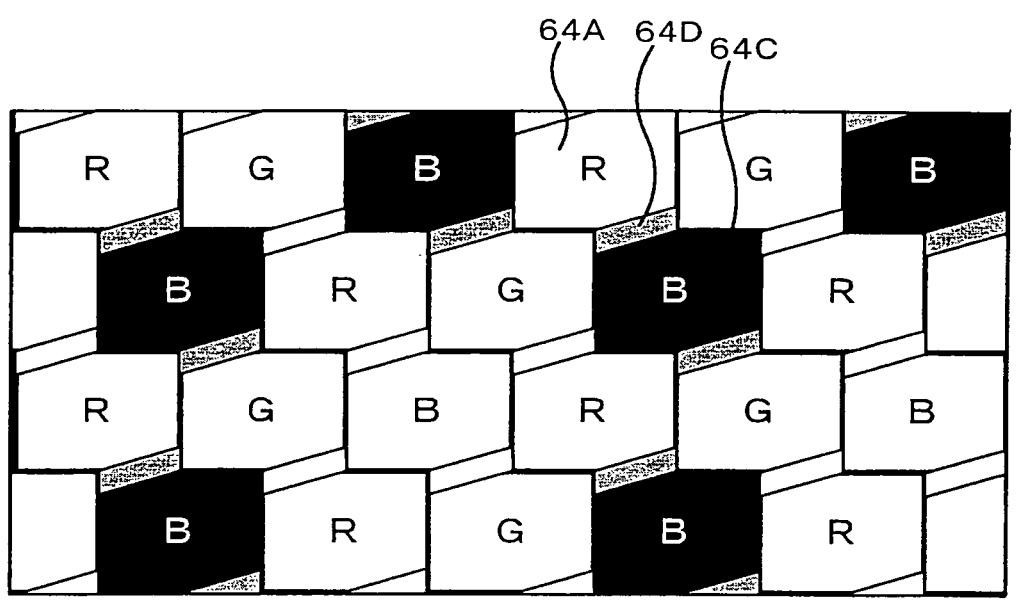
FIG. 27 is a diagram illustrating an example of gradation of brightness in a display of subpixels.

When the adjacent color pixel 64C is displaying black (i.e., the value of gradation of brightness is 0) as shown in FIG. 27, the liquid crystal panel control circuit 110 increases the value of the gradation of brightness of the subpixel 64D to more than 0. Since the intensity of electric field generated by the pixel electrode 12D of the subpixel 64D is lower than the intensity of electric field generated by the pixel electrode 12C of the color pixel 64C because of a large value of gradation of the pixels, the influence of the electric field generated by the color pixel 64C on the color pixel 64A can be weakened. Especially, the influence on pixels that are adjacent in a direction orthogonal to the rubbing direction (DL) on the pixel electrode 12 side is great. Therefore, the liquid crystal panel control circuit 110 makes the value of gradation of brightness of the subpixel 64D greater than 0 when the color pixel 64C that is in contact with a longer side of the subpixel 64D of a tetragonal shape with longer sides is displayed in black. That is, the liquid crystal panel control circuit 110 increases the value of the gradation of brightness of the subpixel 64D formed in a direction substantially orthogonal to the rubbing direction (DL) on the pixel electrode 12 side to be greater than 0. For example, when the gradation of the color pixel 63C is 0, the liquid crystal panel control circuit 110 adjusts the gradation of the subpixel 64D to be equal to or more than 1.

Figure 28:
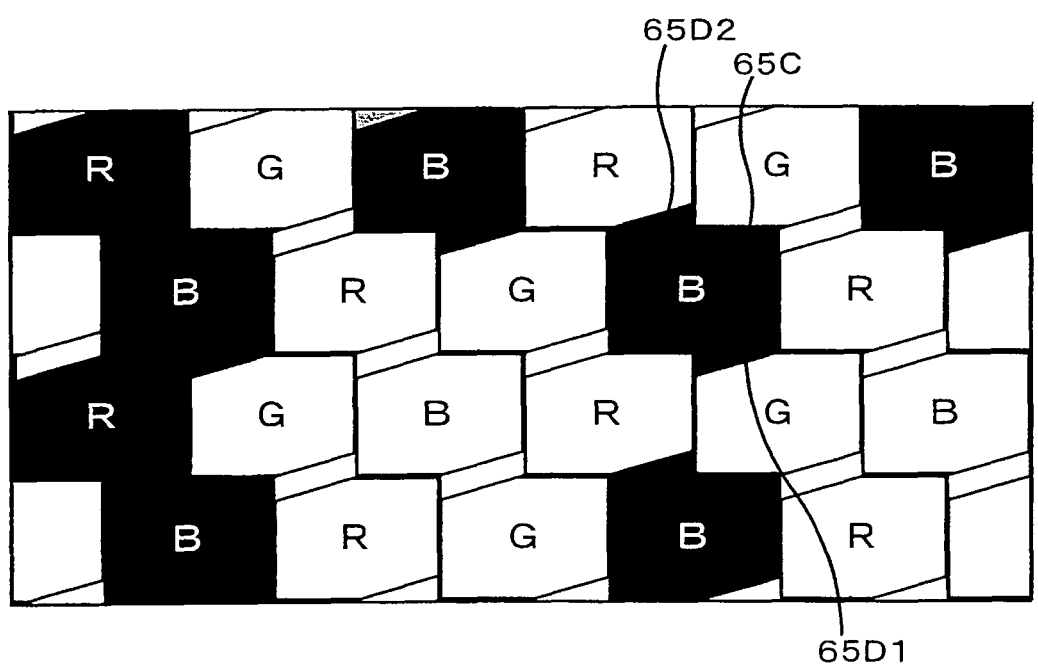
FIG. 28 is a diagram illustrating an example of gradation of brightness in a display of subpixels.

The present invention is not limited to the case where when the adjacent color pixel 64C is displayed in black (i.e., the value of gradation of brightness is 0), the liquid crystal panel control circuit 110 sets the value of gradation of brightness of the adjacent subpixel 64C (the value of the step of brightness is 0) to be greater than 0. When the color pixel 65C with which the longer sides of the subpixel 65D1 and 65D2 are in contact are displayed in black (i.e., the value of gradation is 0), the liquid crystal panel control circuit may set the values of gradations of brightness of the subpixels 65D1 and 65D2 as shown in FIG. 28. The purpose of this is to prevent the white subpixels 65D1 and 65D2 from seeming to come off from among the black color pixels 65C.

According to the third embodiment as described above, the following advantageous effect can be obtained.

(1) Pixels of white filters 13D (subpixel) are formed adjacent to sides in a direction substantially orthogonal to the rubbing direction (DL) of the alignment film 14 on the pixel electrode 12 side. This makes it possible to prevent a decrease in brightness of a display on the liquid crystal panel 1 due to mutual influence between the pixels equipped with the color filters. Moreover, the subpixel including the white filter 13D also plays a role of an alleviation zone that alleviates the influence of the electric field between the pixels equipped with the color filters.

Figure 23:
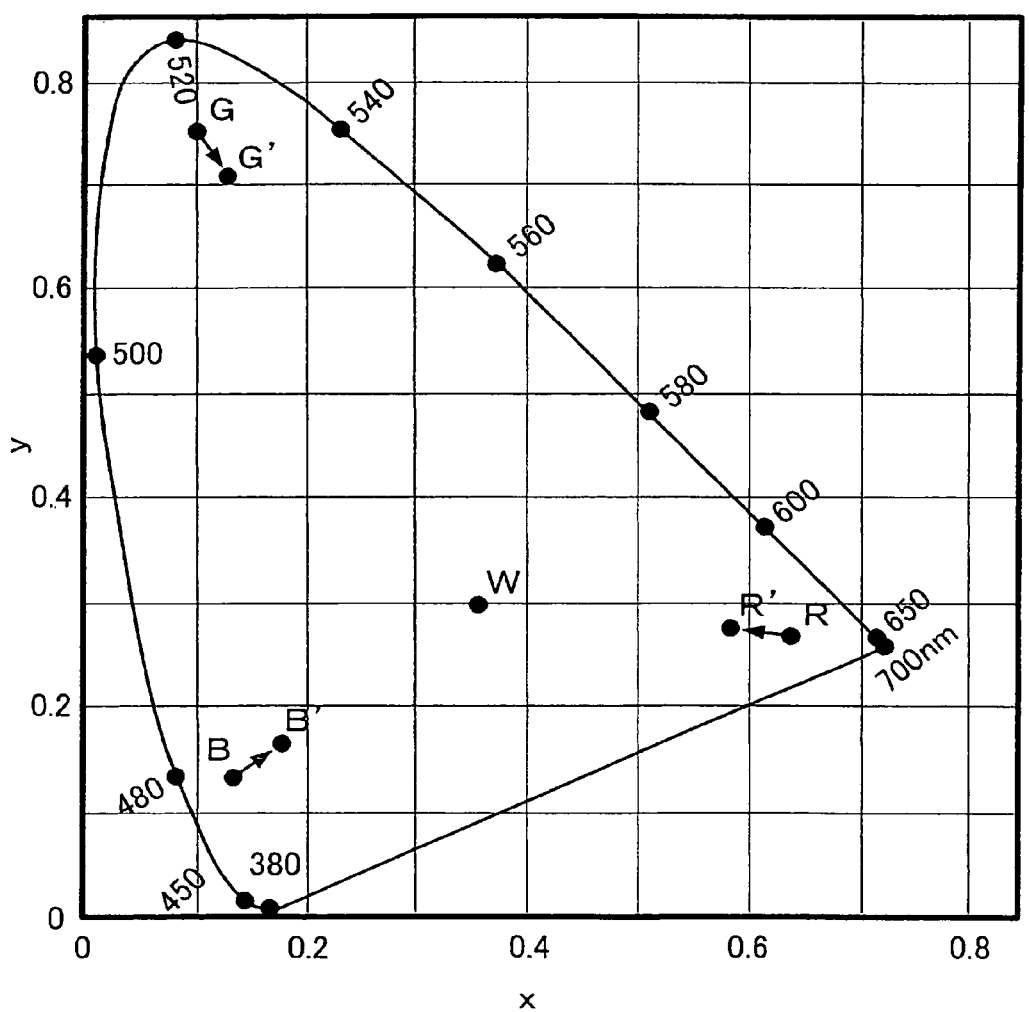
FIG. 23 is a diagram illustrating a color coordinate.

(2) Hue of the display does not change by the luminescence of the subpixels because white filters are used as color filters of the subpixels. As indicated in a graph of chromaticity coordinate shown in FIG. 23, when the subpixel is allowed to emit light, the chromaticity of red displayed on the liquid crystal panel 1 shifts from R to R', the chromaticity of green shifts from G to G', and the chromaticity of blue shifts from B to B'. Here, R, G, and B represent the chromaticities of red, green, and blue projected on the projection plane when the white filters 13D are not displayed. Thus, the chromaticity that the liquid crystal panel 1 can display shifts toward the white chromaticity (W) side by displaying the white filters 13D and the ranges of colors that can be displayed are narrowed. However, hue of the display does not change by the luminescence of the white filters 13D because the total color balance is maintained.

—Modification—

The above-mentioned embodiment may be modified as follows.

Figure 29A:
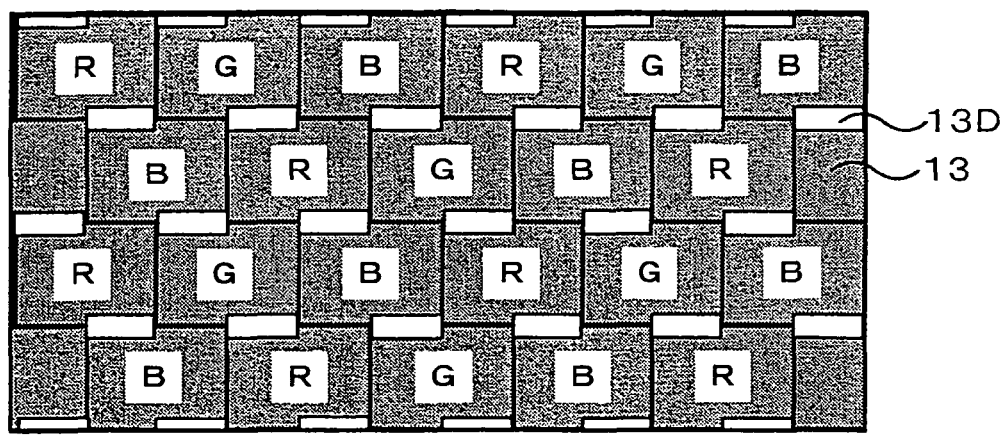
FIGS. 29A and 29B are diagrams illustrating a modification of the shape of white filters.
Figure 29B:
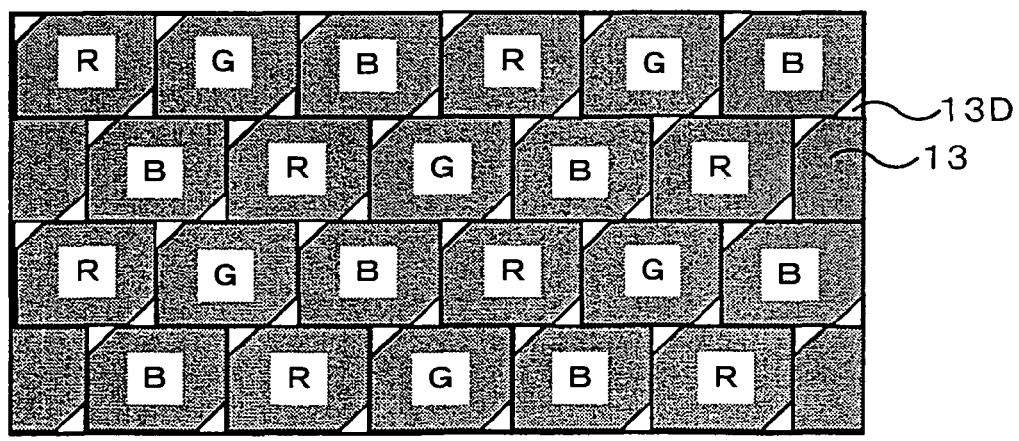

(1) In the above-mentioned embodiment, the shape of the pixel (subpixel) of the white filter 13D is parallelogram. However, it is not especially limited thereto. For example, the shape of the subpixel 13D may be a quadrangle as shown in FIG. 29A or a triangle as shown in FIG. 29B.

Figure 30A:
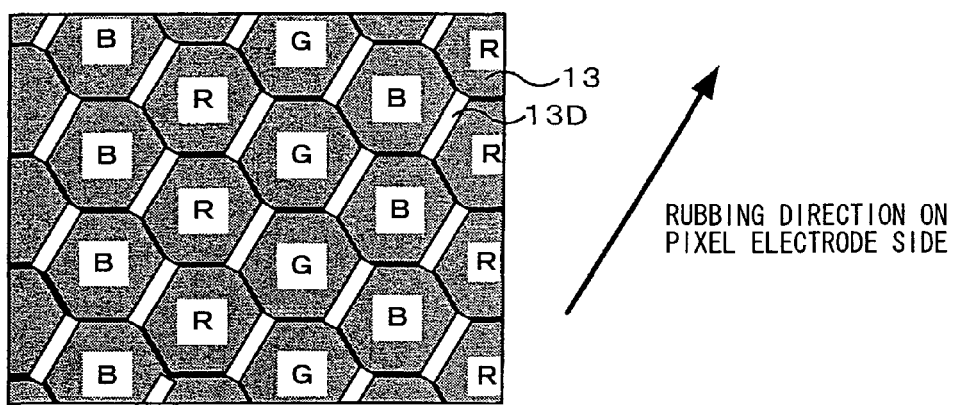
FIGS. 30A and 30B are diagrams illustrating a modification of the shape of white filters.
Figure 30B:
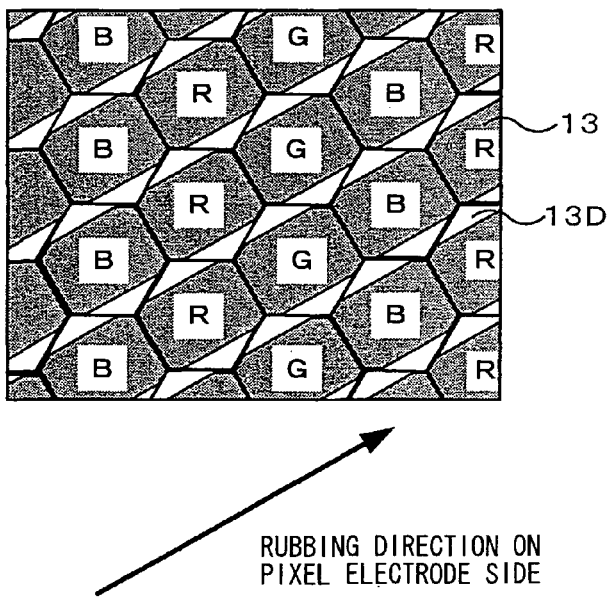

(2) While the shape of the pixels of color filters 13A to 13C is a hexagon in the above-mentioned embodiment, it is not limited to that described in the embodiment as far as it is a polygon having six or more angles. For example, it may be an octagon as shown in FIG. 30A or FIG. 30B. By using color pixels having a shape of a polygon having 6 or more angles, the pixels can be arranged in the liquid crystal panel substantially without spaces even if subpixels are disposed adjacent thereto.

Figure 31:
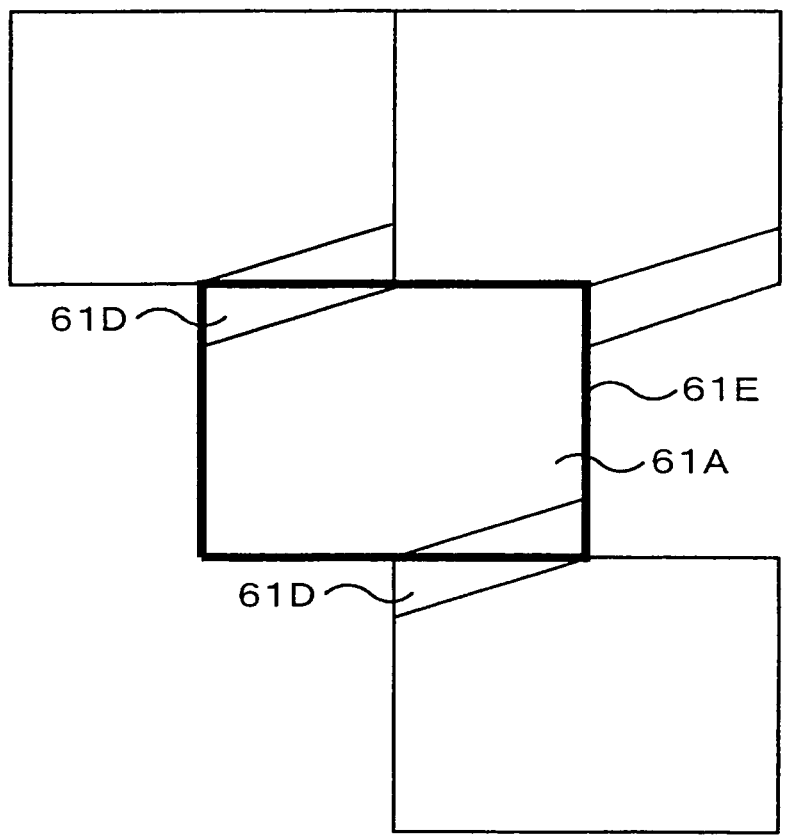
FIG. 31 is a diagram illustrating the length of a diagonal line of the white filter.

(3) FIG. 31 shows a rectangular arrangement in which the diagonal line segment and a shorter side of the parallelogram of subpixel 61D and a side of hexagonal color pigment 61A that is not contact with the subpixel 61D together form a rectangle (bold line 61E). In this case, it is preferred that the diagonal length of the parallelogram of subpixel 61D is ½ of the lengths of the longer side of the above-mentioned rectangular shape 61E. As a result, the subpixel 61D can be regularly arranged in the liquid crystal panel 1.

(4) When the shape of the subpixel is a rectangle or a parallelogram, if the angle between the direction of the longer side of the subpixel and the rubbing direction (DL) of the pixel electrode 12 side is an acute angle, the direction of the longer side of the subpixel does not have to be parallel to the rubbing direction (DL). As a result, the length along which the longer side of the subpixel and the side in the direction orthogonal to the rubbing direction (DL) of the color pixel contact can be increased and the effect of the subpixel can be increased.

(5) It is preferred that the total area of the white filters 13D in the liquid crystal panel 1 is 20% or less of the total area of the color filters 13A to 13C. This is because if the total area of the white filters 13D is larger than 20%, the amount of shift from R to R, the amount of shift from G to G', and the amount of shift from B to B' become too great to be acceptable and the range of color that can be displayed by the liquid crystal panel 1 becomes too narrow to be acceptable. Moreover, it is preferred that the total area of the subpixels is 20% or less of the total area of the color pixels for the same reason as above.

(6) It is preferred that the total area of the white filters 13D is equal to or smaller than the total area of the color filters 13A to 13C in the liquid crystal panel 1. To be concrete, it is preferred that the total area of the white filters 13D is equal to or smaller than any of the total areas of the red filters 13A, the total area of the green filters 13B, and the total area of the blue filters 13C. Similarly, it is preferred that the total area of the subpixels is equal to or smaller than the total area of the color pixels (R pixels, G pixels, and B pixels) of the color filters 13A to 13C.

Figure 32A:
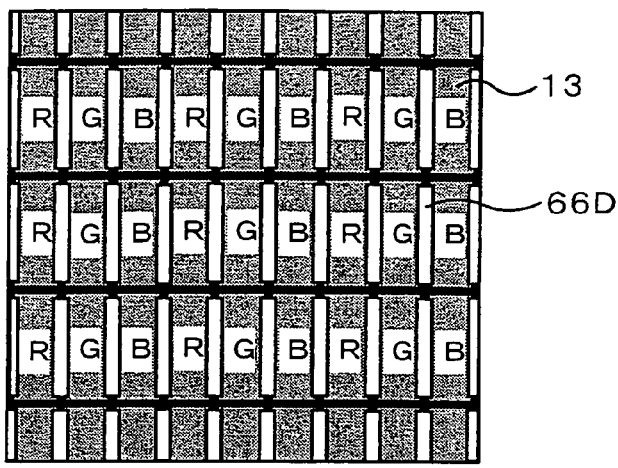
FIGS. 32A to 32C are diagrams illustrating modifications of the arrangement of pixels.
Figure 32B:
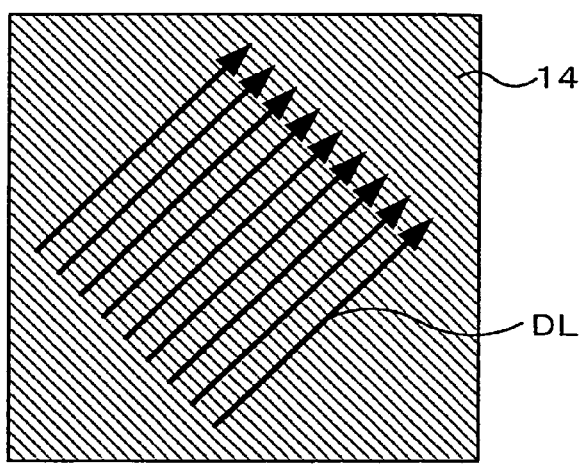
Figure 32C:
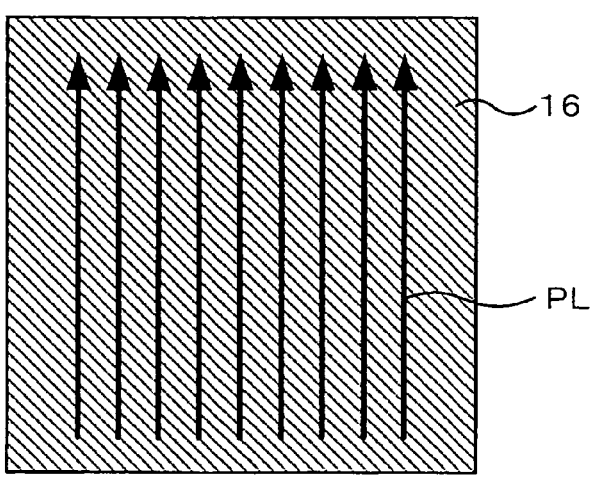

(7) The arrangement of the pixels with the color filters (color pixels) is not limited to the delta array. For example, it may be a grid-like array as shown in FIG. 32A. FIG. 32B is a diagram illustrating the rubbing direction (DL) of the alignment film 14 on the common electrode 12 side and FIG. 32C is a diagram illustrating the rubbing direction (PL) of the alignment film 16 on the common electrode 17 side. In this case, too, subpixels 66D are formed adjacent to color pixels in a direction substantially orthogonal to the rubbing direction (DL) of the alignment film 14 on the pixel electrode 12 side in the color pixels.

Figure 33A:
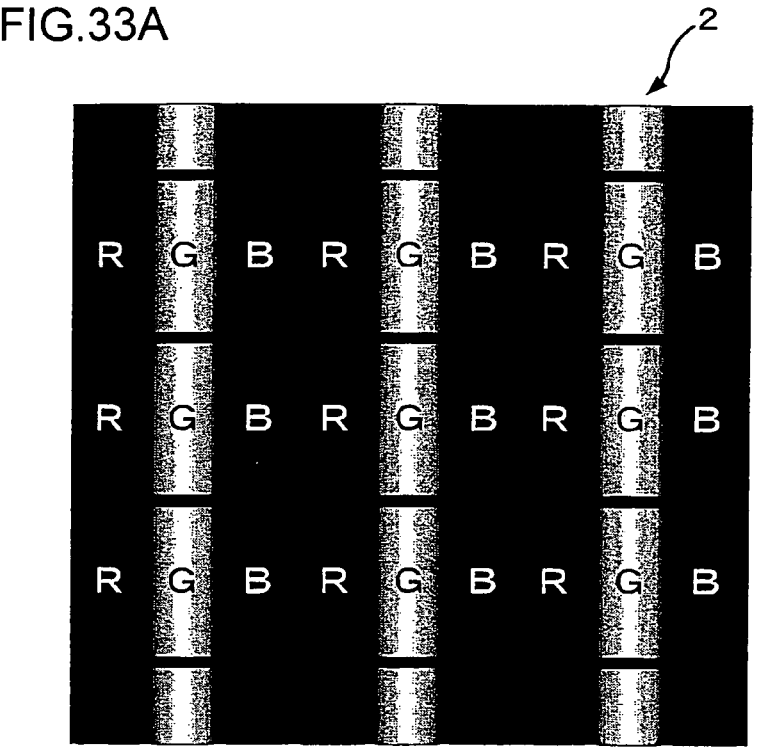
FIGS. 33A and 33B are diagrams illustrating modifications of the arrangement of subpixels.
Figure 33B:
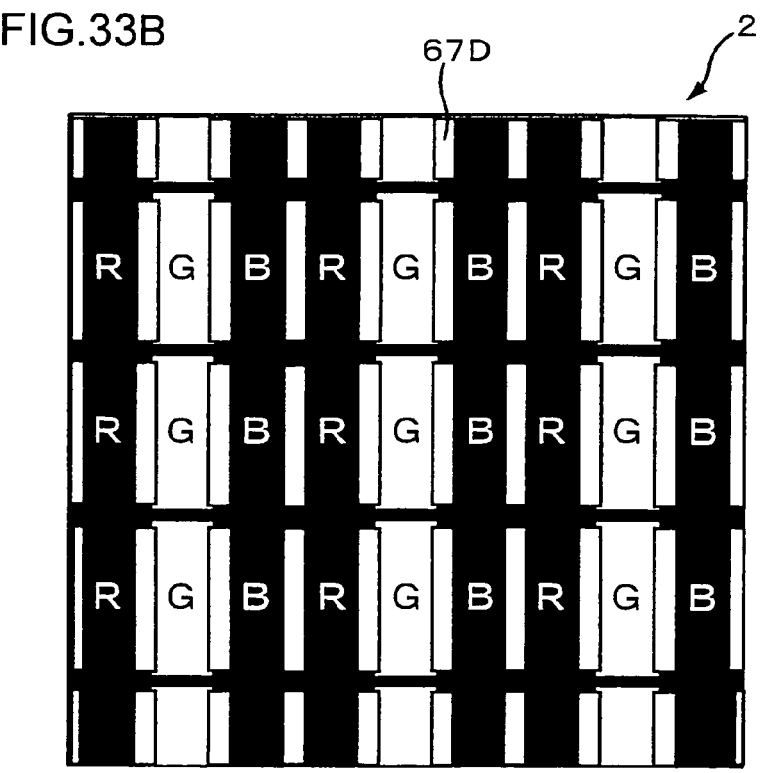
Figure 34:
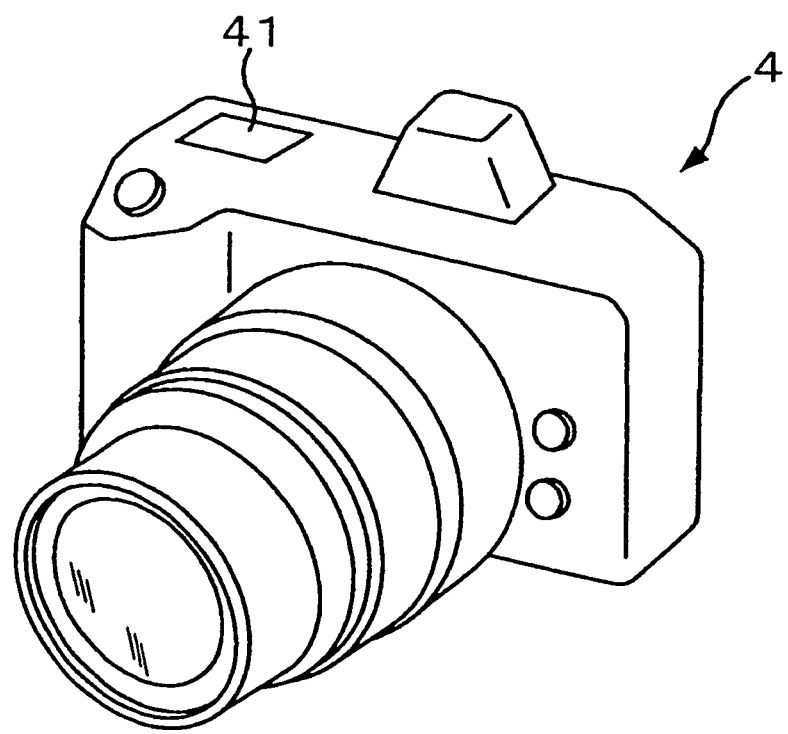
FIG. 34 is a diagram illustrating a display device provided with the liquid crystal panel of the present invention.

(8) If no subpixels are provided, there may occur portions of the displayed color pixels darkened because of the influences by the adjacent pixels as shown in FIG. 33A. The positions where the subpixels 67D are formed are not limited to the positions in the embodiment as far as the subpixels 67D are arranged at positions corresponding to the portions that are darkened as shown in FIG. 33B. This is because the portions where the pixels that are otherwise darkened become brighter by the provision of the subpixels 67D. In this case, the subpixels are arranged in the portions where the pixels are darkened regardless of the rubbing direction on the pixel electrode side.

The first to the third embodiments as described above may be modified as follows.

(1) While the liquid crystal panels 1 and 1A according to the above-mentioned embodiments are reflection-type liquid crystal panels, also transmission-type liquid crystal panels may be used. The principle in which the display of the liquid crystal panels 1 and 1A according to the above-mentioned embodiments is performed is a TN method. However, the present invention is not limited to the principle of display used in the embodiments. For example, an STN (Super Twisted Nematic) liquid crystal or a vertically aligned liquid crystal may be used. The driving method of the liquid crystal panels 1 and 1A according to the above-mentioned embodiments is an active matrix method using TFTs. However, the present invention is not limited to the driving method used in the embodiments as far as it is an active matrix method. For example, an active matrix method using an MIM (Metal Insulated Metal) may also be used.

(2) The treatment to maintain the direction in which the liquid crystal molecules are aligned is not limited to the rubbing treatment used in the above-mentioned embodiments. It may be, for example, an inclined deposition method by which silicon oxide is deposited on a glass substrate.

(3) In the case of the transmission-type liquid crystal panel, the liquid crystal panel may be a liquid crystal panel in which the axis of polarization of a pair of polarization plates are mutually orthogonal (normal white type) or a liquid crystal panel in which the directions of the axis of polarization of the polarization plates are aligned in a predetermined direction (normal black type).

(4) While an example has been shown in which the liquid crystal panel 1 is used in combination with the PBS block 33, it may also be configured such that the liquid crystal panel has polarization plates in stead of the PBS block.

(5) The liquid crystal panels 1 according to the above-mentioned embodiments can be used in compact-size display devices as well as projectors. This is because in a progress of miniaturization of liquid crystal panel 1 at high resolutions, subpixels are also miniaturized and the influences of the electric fields by the adjacent subpixels increase. For example, a top surface display device 41 is attached to the top surface of a camera 4, so that the liquid crystal panel 1 must be miniaturized and hence it is preferred that the display is performed at high resolutions. Therefore, since the influences of the electric fields due to the adjacent subpixels increase, the present invention is suitable for a liquid crystal panel in the top surface display device 41. In this case, the liquid crystal panel 1 will include polarization plates because it does not include the PBS block. Moreover, the liquid crystal panel 1 of the present invention can be applied also to electronic viewfinders and head mounted displays.

The above described embodiments are examples and various modifications can be made without departing from the scope of the invention.

What is claimed is:

1. A liquid-crystal panel that includes a plurality of rectangular pixels arranged in a delta array comprising:
   a liquid crystal containing liquid crystal molecules;
   a plurality of pixel electrodes that is capable of applying electric fields to the liquid crystal;
   a common electrode opposite to the plurality of the pixel electrodes through the liquid crystal;
   a first rubbing member that aligns the liquid crystal molecules in a first direction, which corresponds to a direction of a diagonal line of the pixel electrode, at an interface of the liquid crystal on a side of the pixel electrode; and
   a second rubbing member that aligns the liquid crystal molecules in a second direction, which is a different direction from the first direction, at an interface of the liquid crystal on a side of the common electrode, wherein
   a transparent insulator layer is formed at a corner of the pixel in a direction orthogonal to the first direction in the pixel electrode.

2. A liquid crystal panel according to claim 1, wherein, the transparent insulator layer is formed at two corners in a direction orthogonal to the first direction in the pixel electrode.

3. A liquid crystal panel according to claim 1, wherein, the transparent insulator layer is further formed in an area of other pixel electrodes that are adjacent to the corner in the direction orthogonal to the first the direction.

4. A liquid crystal panel according to claim 1, wherein, the common electrode includes an electric field control member that controls an influence of an electric field generated between the common electrode and the first pixel electrode among the pixel electrodes on the liquid crystal molecules arranged on the side of the common electrode among the liquid crystal molecules on a second pixel electrode adjacent to the first pixel electrode.

5. A display device comprising a liquid crystal panel according to claim 1.

6. A projector comprising a liquid crystal panel according to claim 1.

7. A liquid crystal panel according to claim 1, wherein,
the first rubbing member aligns the liquid crystal in a direction of a diagonal line of the pixel electrode at an interface of the liquid crystal on a side of the pixel electrode when the pixel electrode is not charged, and
the second rubbing member aligns the liquid crystal in a different direction from a diagonal line of the pixel electrode at the interface of the liquid crystal on a side of the common electrode when the pixel electrode is not charged.

8. A liquid crystal panel including a plurality of rectangular pixels in a delta array, the liquid crystal panel comprising:
a liquid crystal containing liquid crystal molecules;
a plurality of rectangular pixel electrodes that is capable of applying electric fields to the liquid crystal;
a common electrode opposite to the plurality of the pixel electrodes through the liquid crystal;
a first rubbing member that aligns the liquid crystal molecules in a first direction of a diagonal line of the pixel electrode at an interface of the liquid crystal on a side of the pixel electrode; and
a second rubbing member that aligns the liquid crystal molecules in a second direction which is a different direction from the first direction at an interface of the liquid crystal on the side of the common electrode, wherein
the common electrode includes an electric field control member formed on the common electrode along a corner in a direction orthogonal to the first direction in the pixel electrode, that controls an influence of an electric field generated between the common electrode and the first pixel electrode among the pixel electrodes on the liquid crystal molecules arranged on the side of the common electrode among the liquid crystal molecules on a second pixel electrode adjacent to the first pixel electrode.

9. A liquid crystal panel according to claim 8, the electric field control member includes a slit-like non-conductive part formed on the common electrode along a corner in a direction orthogonal to the first direction in the pixel electrode.

10. A liquid crystal panel according to claim 8, the electric field control member includes a transparent insulator layer formed on the common electrode along a corner in a direction orthogonal to the first direction in the pixel electrode.

11. A liquid crystal panel according to claim 8, wherein,
the first rubbing member aligns the liquid crystal in a direction of a diagonal line of the pixel electrode at an interface of the liquid crystal on a side of the pixel electrode when the pixel electrode is not charged, and
the second rubbing member aligns the liquid crystal in a different direction from a diagonal line of the pixel electrode at the interface of the liquid crystal on a side of the common electrode when the pixel electrode is not charged.

12. A liquid crystal panel comprising:
a liquid crystal of which a direction of alignment is set;
a color filter including a plurality of color separation filters that separates incident light into a plurality of color components;
a plurality of white filters adjacent to the color filters as sandwiched between at least two of the color separation filters among the plurality of the color separation filters;
a light quantity control electrode including a pixel electrode provided for each of the color separation filters and the white filters and a common electrode common to the pixel electrodes, that controls light quantity of light that is transmitted through the color separation filters and the white filter by controlling the alignment of the liquid crystal;
a first alignment film that is provided on a side of the common electrode and that aligns the liquid crystal in the first direction; and
a second alignment film that is provided on a side of the pixel electrode and that aligns the liquid crystal in the second direction; wherein
a pixel array for a display includes a plurality of pixels that corresponds to the plurality of color separation filters and a plurality of pixels that corresponds to the plurality of white filters; and
the white filter is arranged adjacent to the color separation filters in a direction substantially orthogonal to the second direction.

13. A liquid crystal panel according to claim 12, wherein a shape of the color separation filter is a polygon, a number of corners of which is six or more.

14. A liquid crystal panel according to claim 12, wherein a shape of the white filter is a triangle or a quadrangle.

15. A liquid crystal panel according to claim 12, wherein the plurality of color separation filters is arranged in a delta array, and
a shape of the white filter is a parallelogram, and a length of a diagonal line of the white filter is ½ of a length of a longer side of the parallelogram when the rectangular shape is formed by a combination of a shorter side of the white filter, the diagonal line of the white filter, and a side of the color separation filter that is not in contact with the white filter.

16. A liquid crystal panel according to claim 12, wherein,
a shape of the white filter is a quadrangle having longer sides, and an angle between the longer side of the white filter and the second direction is either 0° or an acute angle.

17. A liquid crystal panel according to claim 12, wherein a ratio of a total area of the white filter to a total area of the color separation filter is 20% or smaller.

18. A liquid crystal panel according to claim 12, wherein a total area of the white filter is equal to or smaller than a total area of each of the plurality of color separation filters.

19. A liquid crystal panel device comprising:
a liquid crystal panel according to claim 12; and
a liquid crystal panel device comprising:
a liquid crystal panel according to claim 12; and
a pixel signal generation unit that generates a pixel signal applied to the light quantity control electrode, wherein,
the pixel signal generation unit generates the pixel signal such that a value of a gradation of brightness of the pixel displayed by the white filter is equal to or smaller than each of values of gradation of brightness of pixels displayed by adjacent two color separation filters sandwiching the white filter when the pixels displayed by adjacent two color separation filters sandwiching the white filter displays colors other than black.

20. A display device comprising a liquid crystal panel according to claim 19.

21. A projector comprising a liquid crystal panel according to claim 19.

22. A liquid crystal panel device comprising:
a liquid crystal panel according to claim 12; and,
a pixel signal generation unit that generates a pixel signal applied to the light quantity control electrode, wherein,
the pixel signal generation unit generates the pixel signal such that a value of gradation of brightness of the pixel displayed by the white filter is equal to a value of gradation of brightness of the pixels displayed by four color separation filters, when three of four color separation filters surrounding the white filter are color separation filters corresponding to respective color components and values of gradation of brightness of respective pixels displayed by the four color separation filters are equal.

23. A liquid crystal panel device comprising:
a liquid crystal panel according to claim 12; and a pixel signal generation unit that generates a pixel signal applied to the light quantity control electrode, wherein,
the pixel signal generation unit generates the pixel signal such that a value of a gradation of brightness of the pixel displayed by the white filter is larger than 0, when a shape of the white filter is a quadrangle having longer sides and the pixel displayed by the color separation filter that is in contact with the longer sides of the white filter displays black.

24. A liquid crystal panel device comprising:
a liquid crystal panel according to claim 12; and, a pixel signal generation unit that generates a pixel signal applied to the light quantity control electrode, wherein,
the pixel signal generation unit generates the pixel signal such that a value of a gradation of brightness of the pixel displayed by the white filter is larger than 0, when the color separation filter corresponding to the pixel that displays black is in contact with the white filter on a side in a direction substantially orthogonal to the first rubbing direction.

25. A liquid crystal panel device comprising:
a liquid crystal panel according to claim 12; and
a pixel signal generation unit that generates a pixel signal applied to the light quantity control electrode, wherein
the pixel signal generation unit generates the pixel signal such that a value of a gradation of brightness of the pixel displayed by the white filter is 0, when a shape of the white filter is a quadrangle having longer sides and the pixel displayed by the color separation filter that is in contact with the longer sides of the white filter displays black.

26. A display device comprising a liquid crystal panel according to claim 12.

27. A projector comprising a liquid crystal panel according to claim 12.

28. A liquid crystal panel comprising:
a liquid crystal of which a direction of alignment is set;
a color filter including a plurality of color separation filters that separate incident light into a plurality of color components;
a plurality of white filters adjacent to the color filters sandwiched between at least two of the color separation filters among the plurality of color separation filters; and
a light quantity control electrode including a pixel electrode provided for each of the color separation filters and the white filters and a common electrode common to the pixel electrodes that controls light quantity of light that is transmitted through the color separation filters and the white filters by controlling the alignment of the liquid crystal; wherein
a pixel array for a display includes a plurality of pixels that corresponds to the plurality of color separation filters and a plurality of pixels that corresponds to the plurality of white filters; and
the white filter is arranged in an area where the light quantity of a light that is transmitted through the pixel without the white filter is decreased to a value smaller than a predetermined value due to turbulence of the alignment of the liquid crystal by a pixel signal applied to the adjacent pixel electrodes.

29. A liquid crystal panel according to claim 28, wherein
the plurality of color separation filters is arranged in a delta array, and
a shape of the white filter is a parallelogram, and a length of a diagonal line of the white filter is ½ of a length of a longer side of the parallelogram when the rectangular shape is formed by a combination of a shorter side of the white filter, the diagonal line of the white filter, and a side of the color separation filter that is not in contact with the white filter.

30. A liquid crystal panel device comprising:
a liquid crystal panel according to claim 28; and
a pixel signal generation unit that generates a pixel signal applied to the light quantity control electrode, wherein,
the pixel signal generation unit generates the pixel signal such that a value of a gradation of brightness of the pixel displayed by the white filter is larger than 0, when a shape of the white filter is a quadrangle having longer sides and the pixel displayed by the color separation filter that is in contact with the longer sides of the white filter displays black.

31. A liquid crystal panel device comprising:
a liquid crystal panel according to claim 28; and
a pixel signal generation unit that generates a pixel signal applied to the light quantity control electrode, wherein,
the pixel signal generation unit generates the pixel signal such that a value of a gradation of brightness of the pixel displayed by the white filter is larger than 0, when the color separation filter corresponding to the pixel that displays black is in contact with the white filter on a side in a direction substantially orthogonal to the first rubbing direction.

32. A liquid crystal panel device comprising:
a liquid crystal panel according to claim 28; and
a pixel signal generation unit that generates a signal applied to the light quantity control electrode, wherein
the pixel signal generation unit generates the pixel signal such that a value of a gradation of brightness of the pixel displayed by the white filter is 0, when a shape of the white filter is a quadrangle having longer sides and the pixel displayed by the color separation filter that is in contact with the longer sides of the white filter displays black.

* * * * *